US011949177B2

(12) United States Patent
Wang et al.

(10) Patent No.: US 11,949,177 B2
(45) Date of Patent: Apr. 2, 2024

(54) ANTENNA APPARATUS AND ELECTRONIC DEVICE

(71) Applicant: Huawei Technologies Co., Ltd., Shenzhen (CN)

(72) Inventors: Yan Wang, Shenzhen (CN); Chien-Ming Lee, Shenzhen (CN); Jikang Wang, Shanghai (CN); Jiaqing You, Shanghai (CN); Hanyang Wang, Reading (GB)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 305 days.

(21) Appl. No.: 17/433,770

(22) PCT Filed: Feb. 10, 2020

(86) PCT No.: PCT/CN2020/074578
§ 371 (c)(1),
(2) Date: Aug. 25, 2021

(87) PCT Pub. No.: WO2020/173292
PCT Pub. Date: Sep. 3, 2020

(65) Prior Publication Data

US 2022/0140486 A1 May 5, 2022

(30) Foreign Application Priority Data

Feb. 27, 2019 (CN) ......................... 201910146577.6
Jul. 8, 2019 (CN) ......................... 201910614002.2

(51) Int. Cl.
*H01Q 9/42* (2006.01)
*H01Q 5/371* (2015.01)
*H01Q 1/24* (2006.01)

(52) U.S. Cl.
CPC ............... *H01Q 9/42* (2013.01); *H01Q 5/371* (2015.01); *H01Q 1/242* (2013.01)

(58) Field of Classification Search
CPC .......... H01Q 9/42; H01Q 5/371; H01Q 5/378; H01Q 5/335; H01Q 1/22; H01Q 1/2266;
(Continued)

(56) References Cited

U.S. PATENT DOCUMENTS 6,297,776 B1 10/2001 Pankinaho
9,130,279 B1 9/2015 Lee et al.
(Continued)

FOREIGN PATENT DOCUMENTS

CN 101719598 A 6/2010
CN 202067897 U 12/2011
(Continued)

OTHER PUBLICATIONS

Liu, I-H., et al. "Compact MIMO Antenna for Mini-laptop," Asia-Pacific Microwave Conference 2011, 2011, pp. 833-836.
(Continued)

*Primary Examiner* — Hoang V Nguyen
(74) *Attorney, Agent, or Firm* — Conley Rose, P.C.

(57) ABSTRACT

An antenna has an exciting element disposed above a ground plane of an electronic device. Power fed to the exciting element excites the ground plane to generate radiation. In this way, radiation capability of the ground plane is not affected by clearance between a display screen and the ground plane, and the antenna is applicable to an electronic device with limited antenna space. In addition, the ground plane serves as a radiation aperture of the electronic device.

18 Claims, 38 Drawing Sheets

(58) Field of Classification Search
CPC ............ H01Q 1/243; H01Q 1/36; H01Q 1/38; H01Q 1/44; H01Q 5/50; H01Q 7/00; H01Q 9/265; H01Q 21/28
See application file for complete search history.

(56) References Cited

U.S. PATENT DOCUMENTS

| | | | |
|---|---|---|---|
| 9,570,800 | B2 | 2/2017 | Jang et al. |
| 2003/0122718 | A1 | 7/2003 | Fang et al. |
| 2009/0174611 | A1* | 7/2009 | Schlub ................ H01Q 9/0407 343/702 |
| 2010/0201581 | A1 | 8/2010 | Moon et al. |
| 2012/0268328 | A1 | 10/2012 | Kim et al. |
| 2016/0141767 | A1 | 5/2016 | Zhai et al. |
| 2016/0248146 | A1 | 8/2016 | Wang et al. |
| 2016/0285173 | A1 | 9/2016 | Svendsen et al. |
| 2017/0016978 | A1 | 1/2017 | Hellsten |
| 2017/0324151 | A1 | 11/2017 | Mai |
| 2018/0309193 | A1 | 10/2018 | Wen et al. |

FOREIGN PATENT DOCUMENTS

| | | | |
|---|---|---|---|
| CN | 102723585 | A | 10/2012 |
| CN | 103460505 | A | 12/2013 |
| CN | 103560318 | A | 2/2014 |
| CN | 203690490 | U | 7/2014 |
| CN | 203839506 | U | 9/2014 |
| CN | 104253310 | A | 12/2014 |
| CN | 104253315 | A | 12/2014 |
| CN | 104795628 | A | 7/2015 |
| CN | 104901000 | A | 9/2015 |
| CN | 105490018 | A | 4/2016 |
| CN | 104396086 | B | 9/2016 |
| CN | 106058456 | A | 10/2016 |
| CN | 106935960 | A | 7/2017 |
| CN | 207677073 | U | 7/2018 |
| CN | 108736142 | A | 11/2018 |
| CN | 108886197 | A | 11/2018 |
| CN | 208507963 | U | 2/2019 |
| WO | 2018190808 | A1 | 10/2018 |

OTHER PUBLICATIONS

Adujar, A., et al., "Ground Plane Boosters as a Compact Antenna Technology for Wireless Handheld Devices," IEEE Transactions On Antennas and Propagation, vol. 59, No. 5, May 2011, 10 pages.

* cited by examiner

ANTENNA APPARATUS AND ELECTRONIC DEVICE

CROSS-REFERENCE TO RELATED APPLICATIONS

This is a U.S. National Stage of International Patent Application No. PCT/CN2020/074578 filed on Feb. 10, 2020, which claims priority to Chinese Patent Application No. 201910146577.6 filed on Feb. 27, 2019 and Chinese Patent Application No. 201910614002.2 filed on Jul. 8, 2019. All of the aforementioned applications are hereby incorporated by reference in their entireties.

TECHNICAL FIELD

The present invention relates to the field of antenna technologies, and in particular, to an antenna apparatus applied to an electronic device.

BACKGROUND

To bring a more comfortable visual experience to users, the bezel-less screen industry design (industry design, ID) has become a design trend of portable electronic devices such as mobile phones. The bezel-less screen means a large screen-to-body ratio (usually over 90%). The bezel width of the bezel-less screen is greatly reduced, and internal components of the phone, such as the front-facing camera, receiver, fingerprint reader, and antenna, need to be rearranged. Especially for the antenna design, the clearance area is reduced and the antenna space is further compressed. However, the size, bandwidth, and efficiency of the antenna are correlated and affect each other. If the antenna size (space) is reduced, the efficiency-bandwidth product (efficiency-bandwidth product) of the antenna is definitely reduced. Therefore, the bezel-less screen ID poses great challenges to the antenna design of mobile phones.

An antenna design form commonly used in an existing electronic device such as a mobile phone may be a planar inverted F (planar inverted F) antenna, an inverted F (inverted F) antenna, a monopole (monopole) antenna, a T-shaped antenna, a loop (loop) antenna, or the like. For these antenna designs, the antenna length needs to be at least one quarter to one half of a low-frequency wavelength. This has a high requirement on the antenna space.

How to design an antenna in limited space and meet antenna performance requirements is a research direction in the industry.

SUMMARY

According to the embodiments of the present invention, an antenna apparatus and an electronic device are provided, can effectively excite a ground plane to generate radiation, and are applicable to a bezel-less electronic device whose antenna space is sharply reduced, because a radiation capability of the ground plane is not affected by a size of a clearance between a display screen and the ground plane.

According to a first aspect, this application provides an antenna apparatus. As shown in FIG. 2A to FIG. 2F, the antenna apparatus may include a ground plane 15 and an exciting element 23 of an electronic device.

The ground plane 15 includes a first side (for example, a lateral side 21-1) and a second side (for example, a lateral side 21-5) that are opposite to each other, and a third side (for example, a bottom side 21-7) and a fourth side (for example, a top side 21-3) that are opposite to each other.

The exciting element 23 may have a first branch 29-2 and two second branches (29-1 and 29-3). The second branch 29-1 and the second branch 29-3 may be respectively connected to two ends of the first branch 29-2. An end of the second branch 29-1 that is away from the first branch 29-2 is connected to the ground plane 15, and an end of the second branch 29-3 that is away from the first branch 29-2 is connected to the ground plane 15. The second branch 29-1 and the second branch 29-3 may be used to set the first branch 29-2 on the ground plane 15, and a gap is formed between the first branch 29-2 and the ground plane 15.

The exciting element 23 may be set on the ground plane 15 in proximity to the first side of the ground plane 15. Herein, the proximity may mean that a distance between the exciting element 23 and the first side is less than a specific distance, for example, 4 mm. The specific distance is not limited to 4 mm, and may alternatively be a value such as 3 mm, 2 mm, or 1 mm. In this case, a distance L1 from the exciting element 23 to the first side is less than a distance L2 from the exciting element 23 to the second side.

A difference between a distance p1 from a first end of the exciting element 23 to the third side and a distance p2 from a second end of the exciting element 23 to the fourth side is less than a first value, for example, 15 mm. The first value is not limited to 15 mm, and may alternatively be a value such as 12 mm or 20 mm. The first end of the exciting element 23 is an end close to the third side, and the second end of the exciting element 23 is an end close to the fourth side.

A feeding port 27 may be disposed on the exciting element 23, and a signal source is located in the feeding port 27. A first slot may be disposed on the first branch 29-2 of the exciting element 23, and a first capacitor may be connected in series between two parts of the first branch on both sides of the first slot. The first capacitor may be configured to implement a codirectional current distributed on the exciting element 23.

It can be seen that, in the antenna apparatus provided in the first aspect, an exciting element is set above a ground plane of an electronic device (for example, a mobile phone), and the exciting element is fed to effectively excite the ground plane to generate radiation. In this way, because a radiation capability of the ground plane is not affected by a size of a clearance between a display screen and the ground plane, the antenna solution provided in this application is applicable to a bezel-less electronic device whose antenna space is sharply reduced. In addition, the ground plane serves as one of main radiation apertures of an electronic device (for example, a mobile phone), and exciting the ground plane to generate radiation can significantly improve antenna performance.

With reference to the first aspect, in some embodiments, the exciting element 23 may be parallel to the first side (for example, the lateral side 21-1) of the ground plane 15, or a smaller included angle may be presented between the exciting element 23 and the first side (for example, the lateral side 21-1) of the ground plane 15. In other words, the exciting element 23 and the first side (for example, the lateral side 21-1) of the ground plane 15 may be nearly parallel. The smaller included angle may be less than a first angle, such as 5°. The first angle is not limited to 5°, and may alternatively be an angle such as 3° or 7°. In this case, an included angle $\alpha$ between the exciting element 23 and the first side is less than an included angle $\beta$ between the exciting element 23 and the third side. The exciting element 23 may be parallel to the first side of the ground plane 15. In other words, the included angle α is equal to 0°. In this case, the exciting element 23 may excite the ground plane 15 to generate a stronger current at the first side, and the exciting element 23 is more likely to excite the ground plane 15 to generate resonance.

With reference to the first aspect, m some embodiments, the first slot may be disposed in the middle of the first branch 29-2, so that the codirectional current on the exciting element 23 is stronger, and the ground plane 15 is more likely to be excited to generate radiation. The first capacitor may be a lumped capacitor or a distributed capacitor (for example, a distributed capacitor formed by disposing a gap on the exciting element 23).

With reference to the first aspect, in some embodiments, a feeding form at the feeding port 27 may include, but is not limited to, the following two manners:

In an implementation, as shown in FIG. 2E, the feeding port 27 may be specifically disposed on the first branch 29-2, and may be specifically implemented by disposing a gap 1 on the first branch 29-2. The gap 1 divides the first branch 29-2 into two parts (29-2-A and 29-2-B), and the signal source may be connected in series between the first branch 29-2-A and the first branch 29-2-B.

In another implementation, as shown in FIG. 2F, the feeding port 27 may be specifically disposed on the second branch 29-1 or the second branch 29-3, and may be specifically implemented by disposing a gap 2 on the second branch. An inductor L connected in series in FIG. 2F may be configured to implement impedance matching. A matching network integrated at the feeding port will be described in the following content. Details are not described herein.

With reference to the first aspect, in some embodiments, the first branch 29-2 may be a horizontal branch parallel to the ground plane 15. Optionally, the second branch 29-1 and the second branch 29-3 may be vertical branches perpendicular to the ground plane 15, and are used to suspend the first branch 29-2 on the ground plane 15.

With reference to the first aspect, in some embodiments, the exciting element 23 may be parallel to the first side. In this case, the included angle α=0 and the included angle β=90°. In this case, the exciting element 23 is more likely to excite the ground plane 15 to generate radiation.

With reference to the first aspect, in some embodiments, the exciting element 23 may be set on the first side of the ground plane. In this case, L1 is equal to 0. In this case, the exciting element 23 is more likely to excite the ground plane 15 to generate radiation. In other words, a closer proximity of the exciting element 23 to the first side indicates that the ground plane 15 is more likely to be excited to generate radiation.

With reference to the first aspect, in some embodiments, the distance p1 and the distance p2 may be equal, and both are equal to (Lg−Le)/2. In this case, the exciting element 23 may be set in the middle of the ground plane in proximity to the first side, and the exciting element 23 is more likely to excite the ground plane 15 to generate resonance.

With reference to the first aspect, in some embodiments, the matching network integrated at the feeding port may include a capacitor C and an inductor L, the capacitor C is connected in series to the feeding port, and the inductor L is connected in parallel to the feeding port. The capacitor C may be referred to as a second capacitor, and the inductor L may be referred to as a first inductor.

With reference to the first aspect, in some embodiments, the antenna apparatus provided in this application may further implement a dual-band, a wide-band, or a multi-band, and may be implemented by using the matching network or adding more magnetic rings. Details are described below.

1. Dual-Band Antenna Solution Based on a Matching Network

To implement dual-band matching, the matching network may be: An LC parallel circuit (consisting of L2 and C2 connected in parallel) is connected in series after a capacitor C1 is connected in series, and finally an inductor L2 is connected in parallel. In other words, the matching network integrated at the feeding port may include: The capacitor C1, the LC parallel circuit, and the inductor L2 are connected in series, the capacitor C1 and the LC parallel circuit are connected in series to the feeding port once, and the inductor L2 is connected in parallel to the feeding port. The capacitor C1 may be referred to as a third capacitor, the inductor L2 may be referred to as a second inductor, the capacitor C2 in the LC parallel circuit may be referred to as a fourth capacitor, and the inductor L2 in the LC parallel circuit may be referred to as a third inductor. Optionally, the dual-band may be a low-band (for example, at 800 MHz) and a GPS L1 band (at 1.5 GHz). A configuration for the dual-band matching network may be as follows: C1=1 pF, L1=6 nH, C2=2.2 pF, and L2=4.5 nH.

2. Dual-Band, Wide-Band, or Multi-Band Antenna Solution Based on a Multi-Magnetic Ring To implement a dual-band or a wide-band, a parasitic element (which may also be referred to as a parasitic magnetic ring) may be set on the ground plane 15. In other words, the antenna apparatus provided in this application may further include a parasitic element. On the ground plane 15, like the exciting element 23, the parasitic element may be set in proximity to the first side (for example, the lateral side 21-1) of the ground plane. Herein, the proximity may mean that a distance between the parasitic element and the first side (for example, the lateral side 21-1) of the ground plane is less than a specific distance (for example, 4 mm). In this case, a distance L3 from the parasitic element to the first side of the ground plane is less than a distance L4 from the parasitic element to the second side of the ground plane.

While the exciting element 23 excites the ground plane 15 to generate radiation, the ground plane 15 couples the parasitic element to generate radiation, thereby implementing dual-band radiation.

In some embodiments, the parasitic element may have a same structure as the exciting element 23. The parasitic element may have a third branch and two fourth branches. The third branch is similar to the first branch 29-2 in the exciting element 23, and the fourth branches are similar to the second branches 29-1 and 29-3 in the exciting element 23. Similar to the structure of the exciting element 23, the two fourth branches in the parasitic element may be respectively connected to two ends of the third branch. An end of the fourth branch that is away from the first branch is connected to the ground plane 15. The two fourth branches may be used to set the third branch on the ground plane 15, so that a gap is formed between the third branch and the ground plane 15. Like the exciting element 23, a capacitor may be connected in series on the parasitic element. The capacitor may be referred to as a fifth capacitor. To connect the fifth capacitor in series, a gap may be disposed on the third branch, and the fifth capacitor may be connected in series between two parts of the third branch on both sides of the gap. The gap may be referred to as a second slot.

The parasitic element is not limited to the parasitic magnetic ring having the same structure as the exciting element 23. To implement a multi-band or a wide-band, the parasitic element may alternatively be another antenna, such as a support antenna or a floating antenna. The support antenna may include an IFA antenna, an ILA antenna, and the like.

With reference to the first aspect, in some embodiments, to implement MIMO, the antenna apparatus provided in this application may include a plurality of antenna elements. One antenna element may have one exciting element 23, or may have one exciting element 23 and M (M is a positive integer) parasitic elements. The plurality of antenna elements may be disposed in proximity to the sides of the ground plane 15. In other words, in one antenna element, the exciting element 23 is set in proximity to edges of the ground plane, and the parasitic element is also set in proximity to the edges of the ground plane.

According to a second aspect, this application provides an electronic device. The electronic device includes a non-metal back cover and the antenna apparatus described in the first aspect.

BRIEF DESCRIPTION OF DRAWINGS

To describe the technical solutions in the embodiments of this application more clearly, the following illustrates the accompanying drawings in the embodiments of this application.

DESCRIPTION OF EMBODIMENTS

The following describes the embodiments of the present invention with reference to the accompanying drawings in the embodiments of the present invention.

The technical solutions provided in this application are applicable to an electronic device that uses one or more of the following communications technologies: a Bluetooth (bluetooth, BT) communications technology, a global positioning system (global positioning system, GPS) communications technology, a wireless fidelity (wireless fidelity, Wi-Fi) communications technology, a global system for mobile communications (global system for mobile communications, GSM) communications technology, a wideband code division multiple access (wideband code division multiple access, WCDMA) communications technology, a long term evolution (long term evolution, LTE) communications technology, a 5G communications technology, a SUB-6G communications technology, and other future communications technologies. In this application, the electronic device may be a mobile phone, a tablet computer, a personal digital assistant (personal digital assistant, PDA), or the like.

Figure 1:
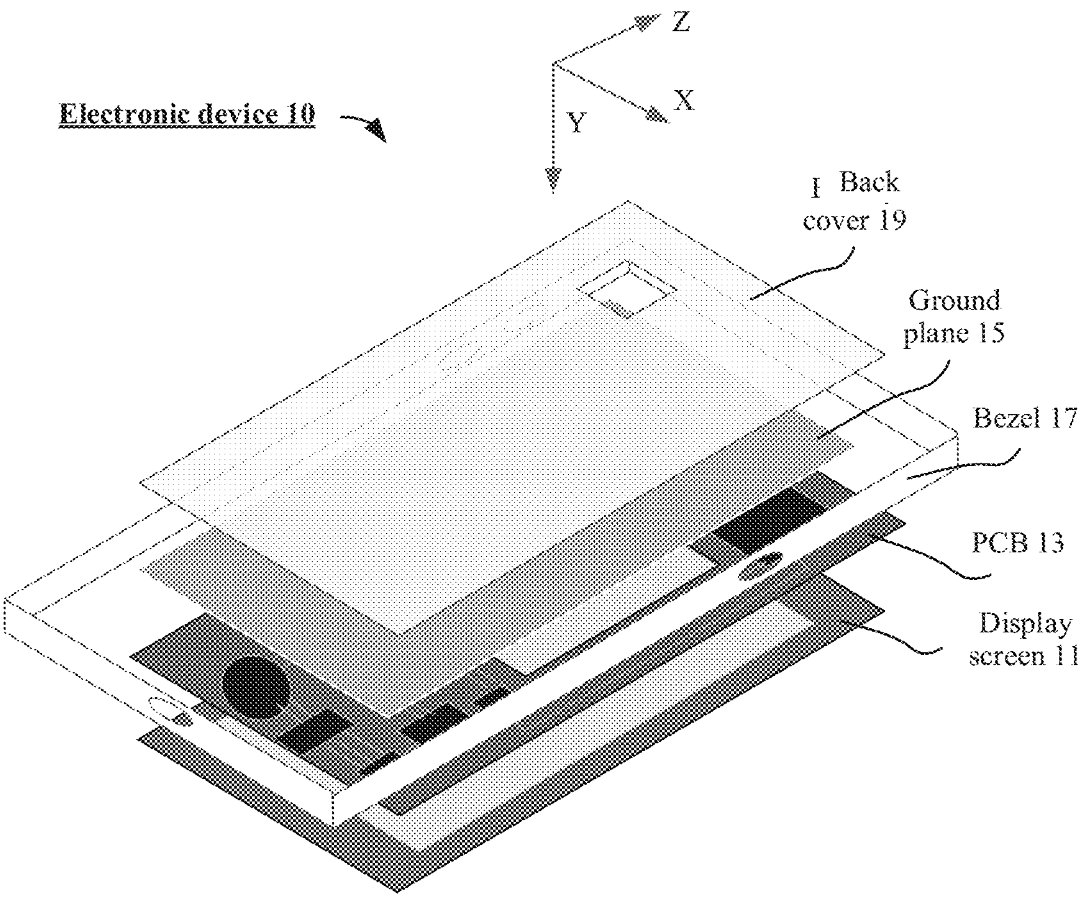
FIG. 1 is a schematic diagram of an internal environment of an electronic device.

FIG. 1 shows an example of an internal environment of an electronic device on which an antenna design solution provided in this application is based. As shown in FIG. 1, the electronic device 10 may include a display screen 11, a printed circuit board PCB 13, a ground plane 15, a bezel 17, and a back cover 19. The display screen 11, the printed circuit board PCB 13, the ground plane 15, and the back cover 19 may be respectively disposed at different layers. These layers may be parallel to each other. A plane on which the layers are located may be referred to as an X-Z plane, and a direction perpendicular to the X-Z plane is a Y direction. In other words, the display screen 11, the printed circuit board PCB 13, the ground plane 15, and the back cover 19 may be layered and distributed in the Y direction.

The printed circuit board PCB 13 may be an FR-4 dielectric board, or may be a Rogers (Rogers) dielectric board, or may be a Rogers and FR-4 hybrid dielectric board, or the like. Herein. FR-4 is a code name for the grade of a flame-resistant material, and the Rogers dielectric board is a high-frequency board.

The back cover 19 is a back cover made of a non-conductive material, for example, a non-metal back cover such as a glass back cover or a plastic back cover.

The ground plane 15 is grounded, and may be disposed between the printed circuit board PCB 13 and the back cover 19. The ground plane 15 may also be referred to as a PCB ground plane. Specifically, the ground plane 15 may be a layer of metal etched on a surface of the PCB 13. This layer of metal may be connected to a metal middle frame (not shown) by using a series of metal elastomers, and is integrated with the metal middle frame. The ground plane 15 may be configured to ground an electronic element carried on the printed circuit board PCB 13. Specifically, the electronic element carried on the printed circuit board PCB 13 may be grounded by connecting the electronic element to the ground plane 15, to prevent a user from being electrocuted or device damage.

The bezel 17 may be disposed around edges of the ground plane 15, and may cover the printed circuit board PCB 13 and the ground plane 15 between the back cover 19 and the display screen 11 from lateral sides, to achieve dust-proof and waterproof purposes. The bezel 17 may be a metal bezel or a non-metal bezel. The bezel 17 may include a frame (which may be referred to as a top frame) 27-3 on a top of the electronic device 10, a frame (which may be referred to as a bottom frame) 27-7 at a bottom of the electronic device 10, and frames (which may be referred to as side frames) 27-1 and 27-5 on lateral sides of the electronic device 10. A front-facing camera (not shown), an earpiece (not shown), an optical proximity sensor (not shown), an ambient optical sensor (not shown), and the like may be disposed on the top of the electronic device 10. A USB charging interface (not shown), a microphone (not shown), and the like may be disposed at the bottom of the electronic device 10. A volume adjustment button (not shown) and a power button (not shown) may be disposed at the lateral sides of the electronic device 10.

FIG. 1 shows only each part included in the electronic device 10 schematically, and an actual shape, an actual size, and an actual structure of each part are not limited by FIG. 1. The display screen 11 of the electronic device 10 may be a large-sized display screen, and a screen-to-body ratio may reach more than 90%.

Based on the internal environment of the electronic device shown in FIG. 1, this application provides a ground plane radiation antenna solution based on magnetic ring feed. In the antenna solution provided in this application, an exciting element is set above the ground plane 15, and the exciting element is fed, to effectively excite the ground plane 15 to generate radiation. In this way, because a radiation capability of the ground plane 15 is not affected by a size of a clearance between the display screen 11 and the ground plane 15, the antenna solution provided in this application is applicable to a bezel-less ID whose antenna space is sharply reduced. In addition, the ground plane 15 is one of main radiation apertures of the electronic device 10, and exciting the ground plane 15 to generate radiation can significantly improve antenna performance.

Figure 2A:
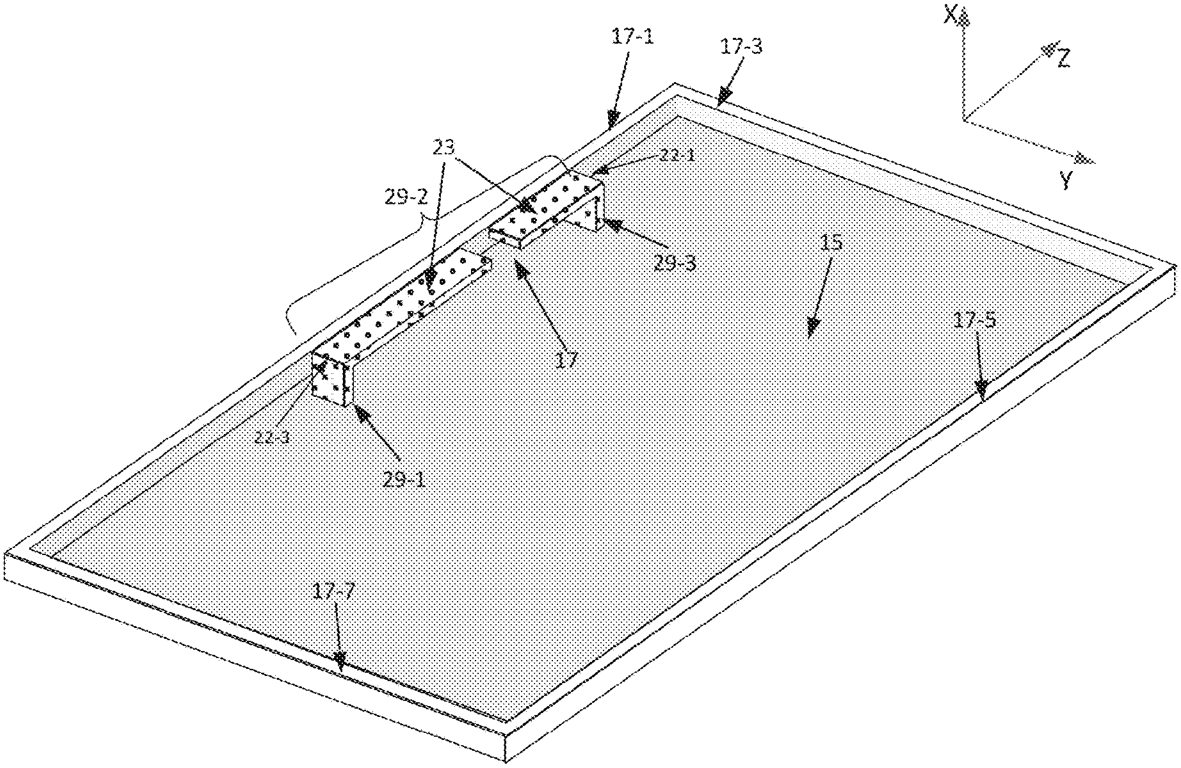
FIG. 2A is a schematic diagram of an overall model of an antenna apparatus according to this application.
Figure 2B:
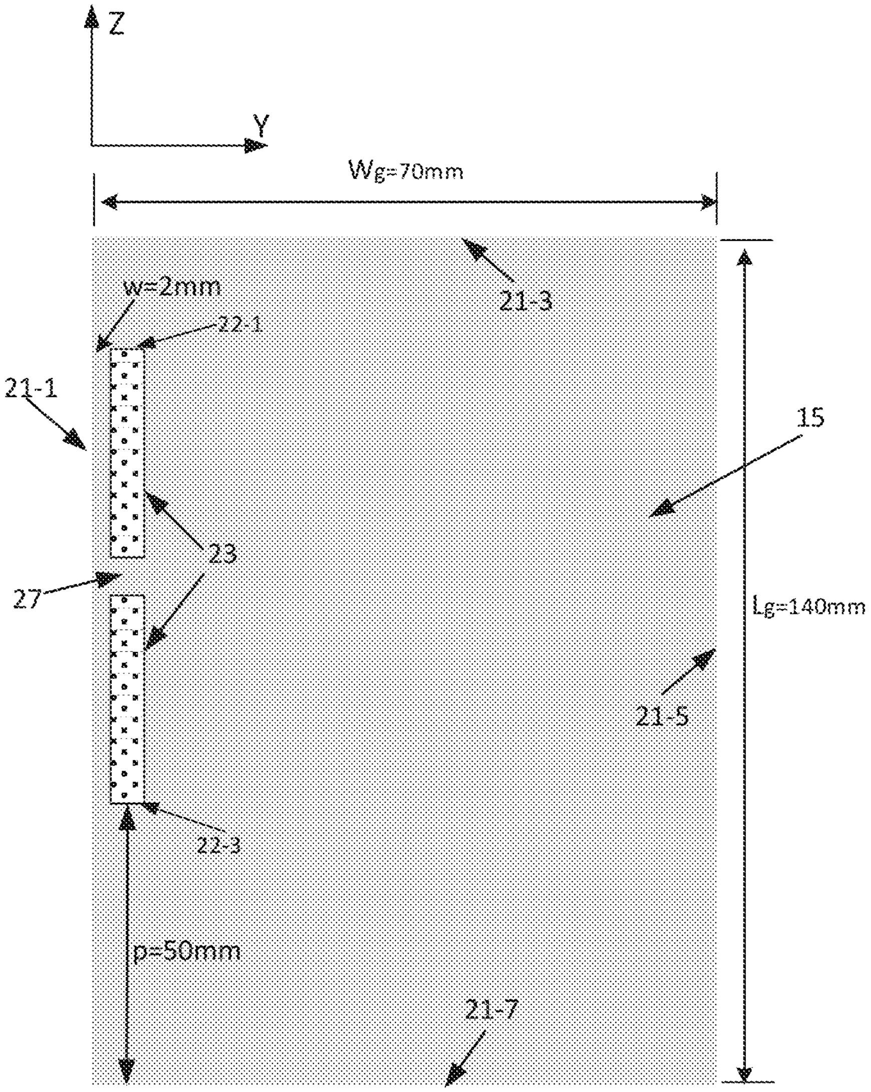
FIG. 2B is a planar view of an antenna structure in an X-Z plane according to this application.
Figure 2C:
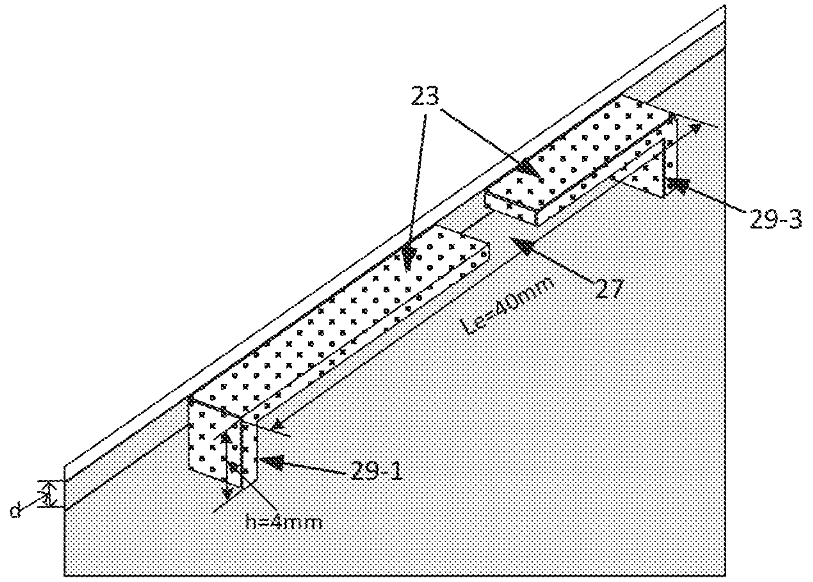
FIG. 2C is a detailed view of a ring exciting element in an antenna structure according to this application.

FIG. 2A to FIG. 2C show an antenna apparatus according to this application. FIG. 2A is a schematic diagram of an overall model of the antenna apparatus, FIG. 2B is a plane view of an antenna structure in an X-Z plane, and FIG. 2C is a detailed view of a ring exciting element in the antenna structure. As shown in FIG. 2A to FIG. 2C, the antenna apparatus may include aground plane (ground plane) 15 and an exciting element (exciting element) 23.

The ground plane 15 may have a lateral side 21-1 and a lateral side 21-5 that are opposite to each other, and a top side 21-3 and a bottom side 21-7 that are opposite to each other. The sides of the ground plane 15 are respectively close to the frames of the bezel 17. Specifically, the lateral side 21-1 is close to the side frame 17-1, the top side 21-3 is close to the top frame 17-3, the lateral side 21-5 is close to the side frame 17-5, and the bottom side 21-7 is close to the bottom frame 17-7. Optionally, the ground plane 15 may be rectangular, the lateral side 21-1 and the lateral side 21-5 may be two opposite long sides, and the top side 21-3 and the bottom side 21-7 may be two opposite short sides.

The exciting element 23 may be set on the ground plane 15 in proximity to a side of the ground plane 15. This side may be referred to as a first side of the ground plane 15.

Herein, the proximity may mean that a distance between the exciting element 23 and the first side of the ground plane 15 is less than a specific distance, such as 4 mm. A smaller distance between the exciting element 23 and the first side of the ground plane 15 indicates that the ground plane 15 is more likely to be excited to generate radiation. This will be analyzed in the following content, and details are not described herein. Optionally, the first side of the ground plane 15 may be a long side of the ground plane 15.

The exciting element 23 may be parallel to the first side of the ground plane 15, or a smaller included angle may be presented between the exciting element 23 and the first side of the ground plane 15. In other words, the exciting element 23 and the first side may be parallel or nearly parallel. The smaller included angle may be less than a first angle, such as 5°. The first angle is not limited to 5°, and may alternatively be an angle such as 3° or 7°.

The exciting element 23 may have a first branch 29-2 and two second branches (29-1, 29-3). The second branch 29-1 and the second branch 29-3 may be respectively connected to two ends of the first branch 29-2. The two ends of the first branch 29-2 may include one end 22-1 close to the top side 21-3 and one end 22-3 close to the bottom side 21-7. An end of the second branch 29-1 that is away from the first branch 29-2 is connected to the ground plane 15, and an end of the second branch 29-3 that is away from the first branch 29-2 is connected to the ground plane 15. The second branch 29-1 and the second branch 29-3 may be used to set the first branch 29-2 on the ground plane 15, and a gap is formed between the first branch 29-2 and the ground plane 15. In other words, the first branch 29-2 is not in contact with the ground plane 15. Optionally, the first branch 29-2 may be a horizontal branch parallel to the ground plane 15. Optionally, the second branch 29-1 and the second branch 29-3 may be vertical branches perpendicular to the ground plane 15, and are used to suspend the first branch 29-2 on the ground plane 15.

FIG. 2B and FIG. 2C further show examples of a size of the ground plane 15, a size of the exciting element 23, and a position of the exciting element 23 on the ground plane 15. Specifically, a length Lg of the ground plane 15 may be 140 mm, and a width Wg of the ground plane 15 may be 70 mm. Herein, the width Wg of the ground plane 15 is a length of a short side (for example 21-3 or 21-7 in FIG. 2B), and the length Lg of the ground plane 15 is a length of a long side (for example, 21-1 or 21-5 in FIG. 2B). A length Le of the exciting element 23 may be 40 mm, and a height h of the exciting element 23 may be 4 mm. Herein, the length Le of the exciting element 23 is a length of the first branch 29-2, and the height h of the exciting element 23 is a length of the second branch. A distance w between the exciting element 23 and the first side (for example, the lateral side 21-1) of the ground plane 15 may be 2 mm, and a distance p between the end 22-3 of the exciting element 23 and the bottom side 21-7 of the ground plane 15 may be 50 mm. Lg, Wg, Le, h, w, and p are not limited to the drawings, and may alternatively be other values, and impact of their values on antenna performance is described in detail in the following content.

Figure 2D:
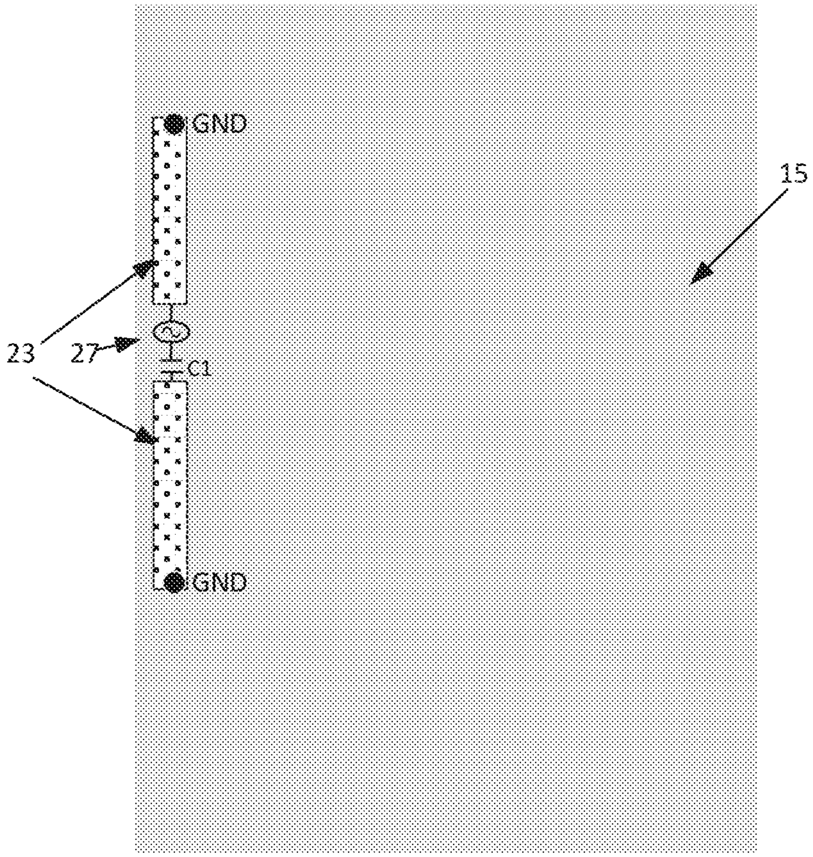
FIG. 2D is a schematic diagram of a feeding form at a feeding port in an antenna structure according to this application.
Figure 2E:
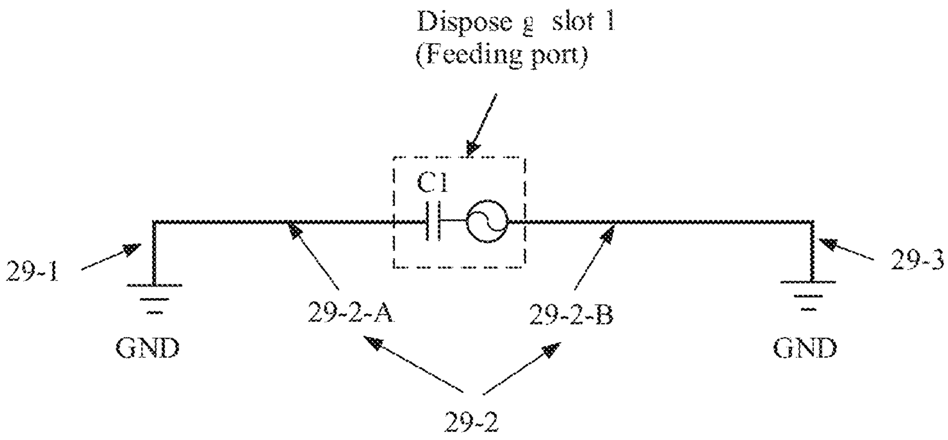
FIG. 2E is a schematic diagram of a feeding form of an antenna apparatus according to this application.
Figure 2F:
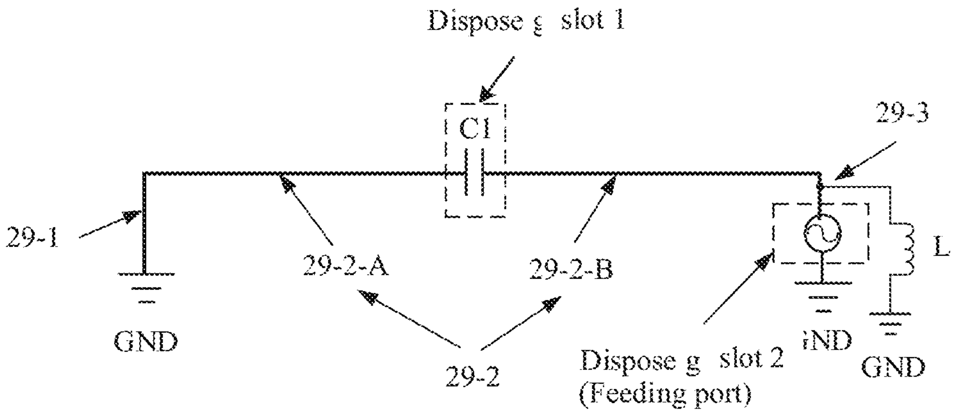
FIG. 2F is a schematic diagram of another feeding form of an antenna apparatus according to this application.

As shown in FIG. 2D, a feeding port 27 may be disposed on the exciting element 23, and a signal source is located in the feeding port 27. In an implementation, as shown in FIG. 2E, the feeding port 27 may be specifically disposed on the first branch 29-2, and may be specifically implemented by disposing a gap 1 on the first branch 29-2. The gap 1 divides the first branch 29-2 into two parts (29-2-A and 29-2-B), and the signal source may be connected in series between the first branch 29-2-A and the first branch 29-2-B. In another implementation, as shown in FIG. 2F, the feeding port 27 may be specifically disposed on the second branch 29-1 or the second branch 29-3, and may be specifically implemented by disposing a gap 2 on the second branch. An inductor L connected m series in FIG. 2F may be configured to implement impedance matching. A matching network integrated at the feeding port will be described in the following content. Details are not described herein.

As shown in FIG. 2D, a capacitor C1 may be further connected in series on the exciting element 23, and the capacitor C1 may be referred to as a first capacitor. The first capacitor may be configured to implement a codirectional current distributed on the exciting element 23. To connect the first capacitor in series, as shown in FIG. 2E and FIG. 2F, a gap 1 may be disposed on the first branch 29-2. The gap 1 may divide the first branch 29-2 into two parts (29-2-A and 29-2-B), and the first capacitor may be connected in series between the first branch 29-2-A and the first branch 29-2-B. The gap 1 in which the first capacitor is located may be referred to as a first slot. Optionally, the first slot may be disposed in the middle of the first branch 29-2, so that the codirectional current on the exciting element 23 is stronger, and the ground plane 15 is more likely to be excited to generate radiation. The first capacitor may be a lumped capacitor or a distributed capacitor (for example, a distributed capacitor formed by disposing a gap on the exciting element 23).

In an embodiment, as shown in FIG. 2E, only one gap, for example, the gap 1, may be disposed on the exciting element 23. In the gap 1, the first capacitor and the signal source may form a series circuit, and then the series circuit may be integrally connected in series between the two parts of the first branch (that is, the first branch 29-2-A and the first branch 29-2-B) on both sides of the gap 1. In other words, the gap in which the first capacitor is located and the gap in which the feeding port is located may be a same gap, and this is not limited thereto. The gap in which the first capacitor is located and the gap in which the feeding port is located may alternatively be two different gaps.

A matching network may be integrated at the feeding port 27. The matching network may be used to adjust (by adjusting an antenna transmit coefficient, an impedance, and the like) a band range covered by the antenna apparatus provided in this application. The matching network may include various structures that can implement impedance matching, such as an impedance conversion line or a lumped element network. A lumped element may include an element such as a capacitor or an inductor. Specifically, an input impedance of the antenna may be adjusted by changing a line width of the impedance conversion line and changing an electrical characteristic parameter (for example, a capacitance value and an inductance value) of a component in the lumped element network, to implement impedance matching.

Figure 3A:
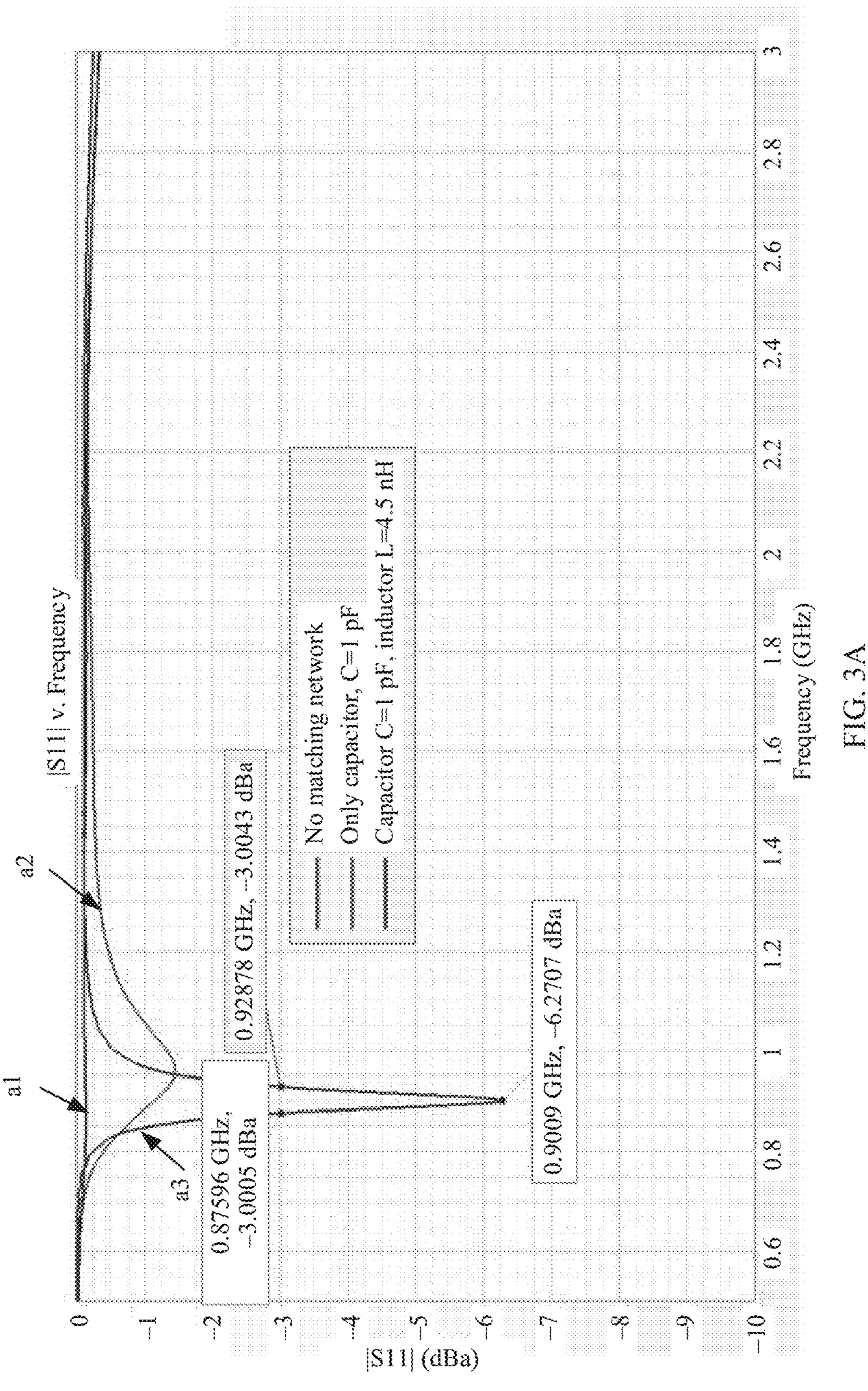
FIG. 3A is a schematic diagram of S11 simulation of an antenna structure in several matching networks according to this application.
Figure 3B:
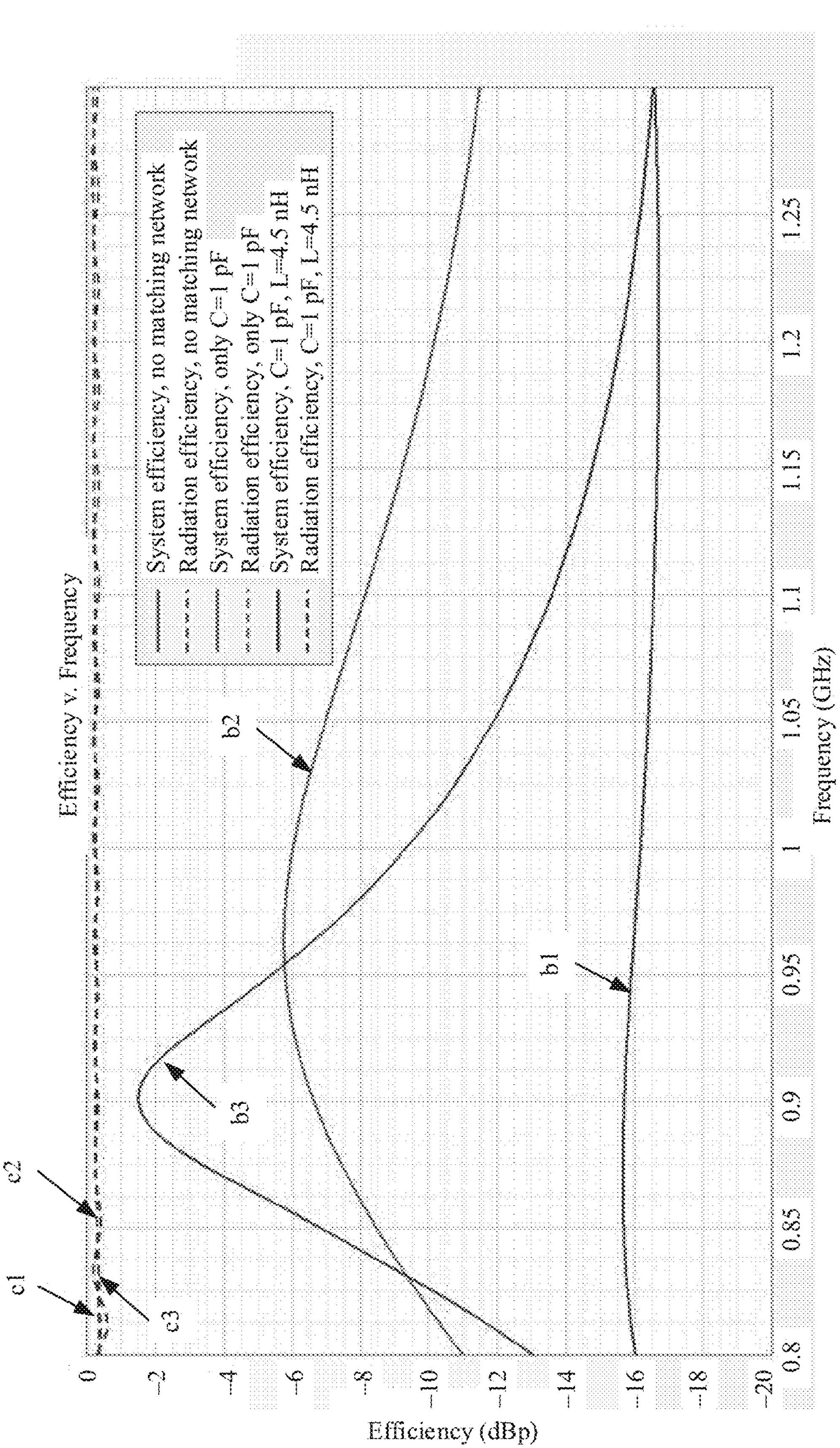
FIG. 3B is an efficiency simulation diagram of an antenna structure in several matching networks according to this application.
Figure 3C:
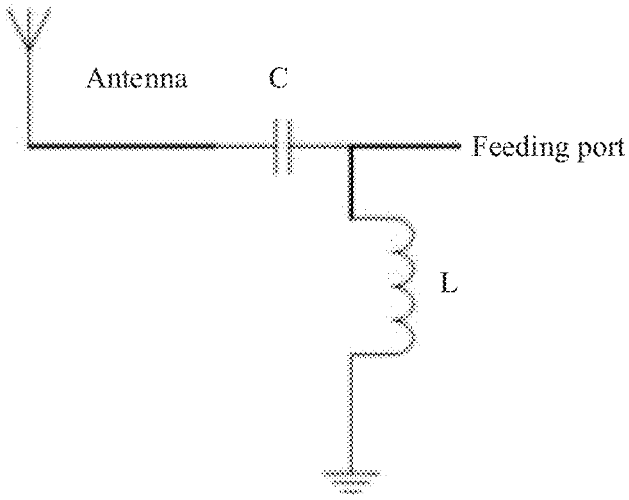
FIG. 3C is a schematic diagram of a matching network of an antenna structure according to this application.

The following describes a matching principle of the exciting element 23. When no matching element is used (namely, there is no matching network), the input impedance in an expected band (for example, 690 MHz to 96 W MHz) is mainly in an inductive area. In this case, S11 simulation of the antenna apparatus may be shown by curve a1 in FIG. 3A, and system efficiency and radiation efficiency of the antenna apparatus may be shown by curves b1 and c1 in FIG. 3B. When only a capacitor C (for example, C=1 pF) is connected in series to the feeding port, the input impedance in an expected band (for example, 690 MHz to 2700 MHz) is manifested as being in a capacitive area in a low band (for example, 690 MHz to 960 MHz), and in an inductive area in a high band (for example, 1700 MHz to 2700 MHz). In this case, S11 simulation of the antenna apparatus may be shown by curve a2 in FIG. 3A, and system efficiency and radiation efficiency of the antenna apparatus may be shown by curves b2 and c2 in FIG. 3B. As shown in FIG. 3C, when the matching network at the feeding port is first connected in series to a capacitor C (for example, C=1 pF) and then connected to an inductor L (for example L=4.5 nH), S11 simulation of the antenna apparatus may be shown by curve a3 in FIG. 3A, and system efficiency and radiation efficiency of the antenna apparatus may be shown by curves b3 and c3 in FIG. 3B.

It can be seen that curve a1 has no resonance, curve a2 has one shallow resonance, and curve a3 has one deep resonance. In addition, antenna efficiency represented by curve b3 is clearly better than antenna efficiency represented by curves b1 and b2. In other words, good impedance matching may be performed on the exciting element 23 by first connecting the capacitor C in series to the feeding port and then connecting the inductor L in parallel, so that the exciting element 23 can effectively excite the ground plane 15 to generate radiation. In other words, the matching network integrated at the feeding port may include a capacitor C and an inductor L, the capacitor C is connected in series to the feeding port, and the inductor L is connected in parallel to the feeding port. The capacitor C may be referred to as a second capacitor, and the inductor L may be referred to as a first inductor.

Figure 4A:
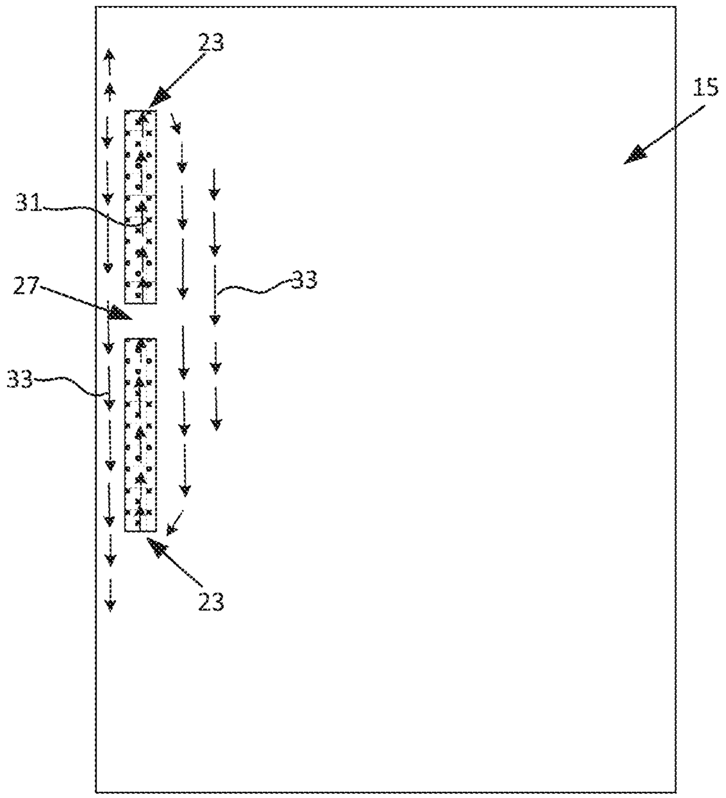
FIG. 4A is a vector current distribution diagram of simulation of an antenna structure according to this application.
Figure 4B:
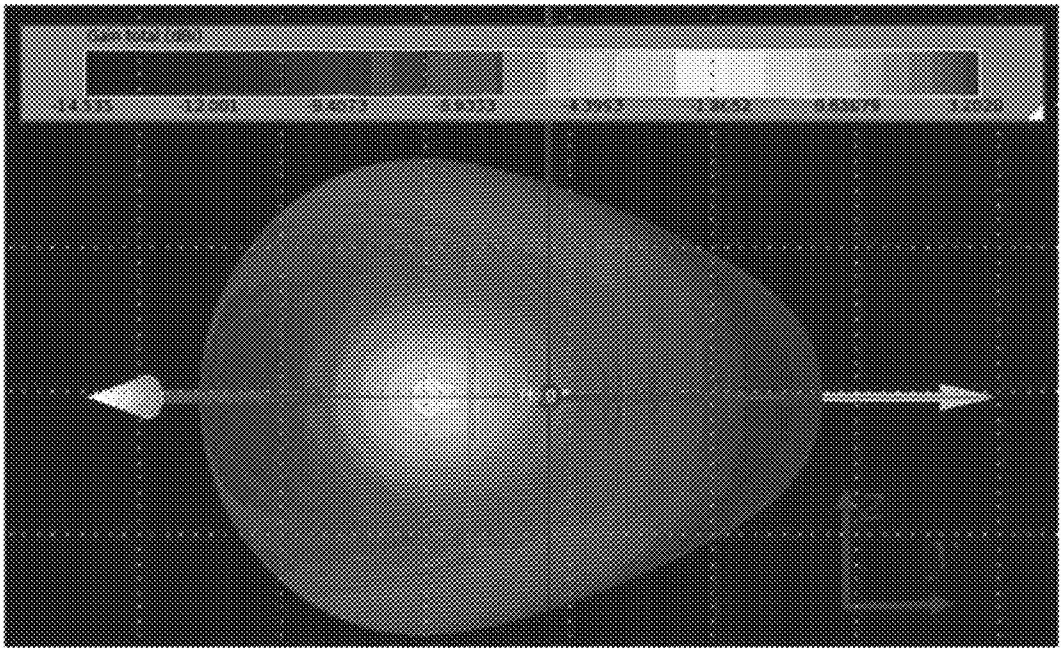
FIG. 4B is a front view of a three-position radiation pattern of an antenna structure operating at 900 MHz according to this application.
Figure 4C:
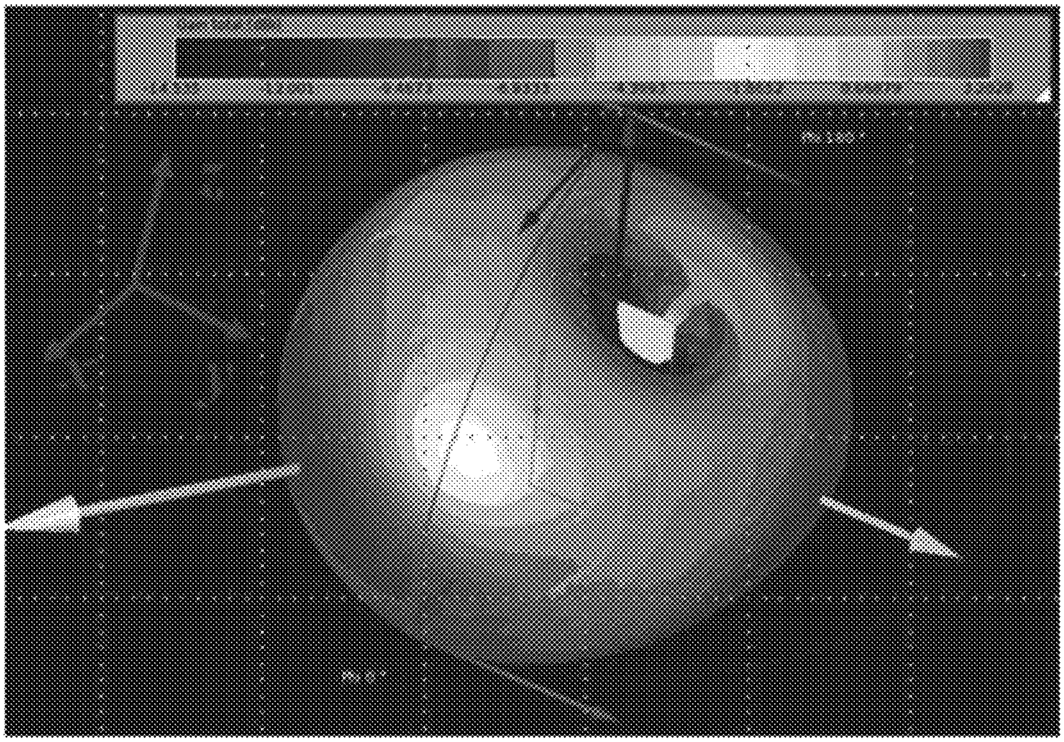
FIG. 4C is a top view of a three-position radiation pattern of an antenna structure operating at 900 MHz according to this application.

The following uses a 900 MHz operating band as an example to describe an operating principle of the antenna apparatus provided in this application. It is assumed that the matching network integrated at the feeding port is that a 1 pF capacitor is first connected in series, and then a 4.5 nH inductor is connected in parallel. Current distribution of the antenna apparatus provided in this application operating at 900 MHz may be shown in FIG. 4A A codirectional current 31 is distributed on the exciting element 23, and the codirectional current 31 distributed on the ring-shaped exciting element 23 may be equivalent to a magnetic current. Therefore, the exciting element 23 may be referred to as a “magnetic ring”. The codirectional current 31 may excite the ground plane 15 to generate a longitudinal current 33, to excite the ground plane 15 to generate resonance, and excite the ground plane 15 to generate radiation. FIG. 4B and FIG. 4C are respectively a front view and an aerial view of a three-dimensional radiation pattern simulated by the antenna apparatus provided in this application operating at 900 MHz. As shown in FIG. 4B to FIG. 4C, a shape of the three-dimensional radiation pattern is similar to that of a radiation pattern of a ½-wavelength dipole. Because a current of the ground plane 15 is mainly concentrated on the lateral side 21-1 of the ground plane 15, the three-dimensional radiation pattern is mainly inclined to one side.

It can be seen that, by setting the exciting element 23 above the ground plane 15, feeding the exciting element 23, and setting an appropriate matching network at the feeding port, the ground plane 15 can be effectively excited to generate radiation. In this way, the requirement on antenna space can be reduced, the antenna solution provided in this application is applicable to a bezel-less 1D whose antenna space is sharply reduced, and antenna performance can be significantly improved.

The following describes application of the antenna design solution provided in this application to an actual overall system model.

Figure 5A:
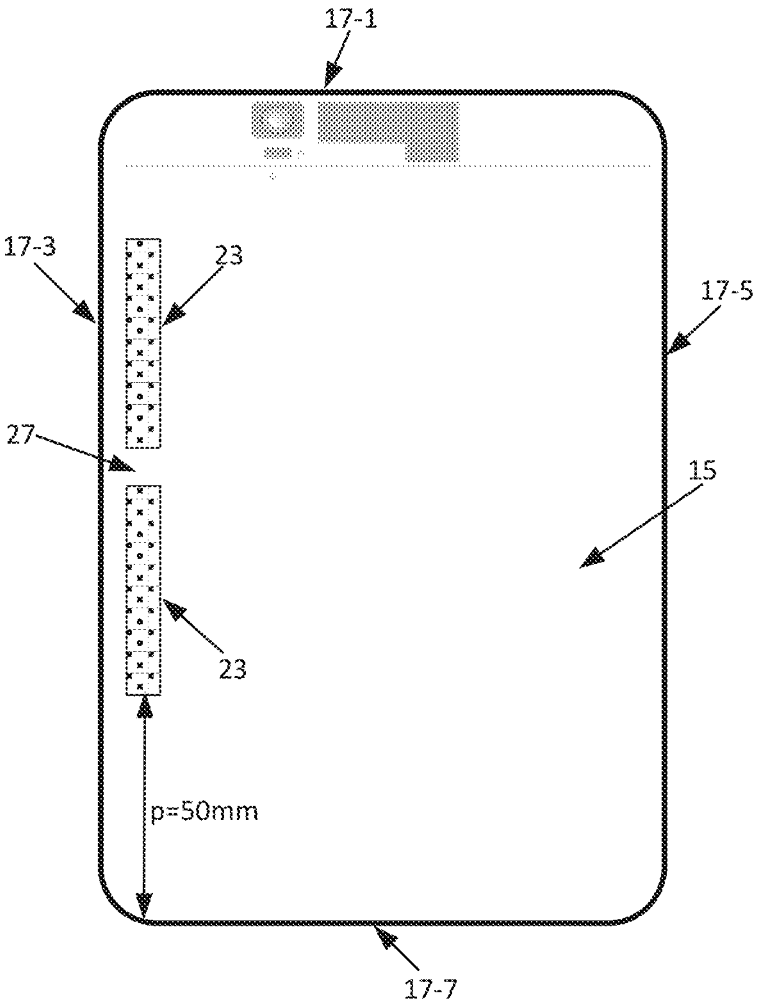
FIG. 5A is a schematic application diagram of an antenna structure in an overall system model according to this application.
Figure 5B:
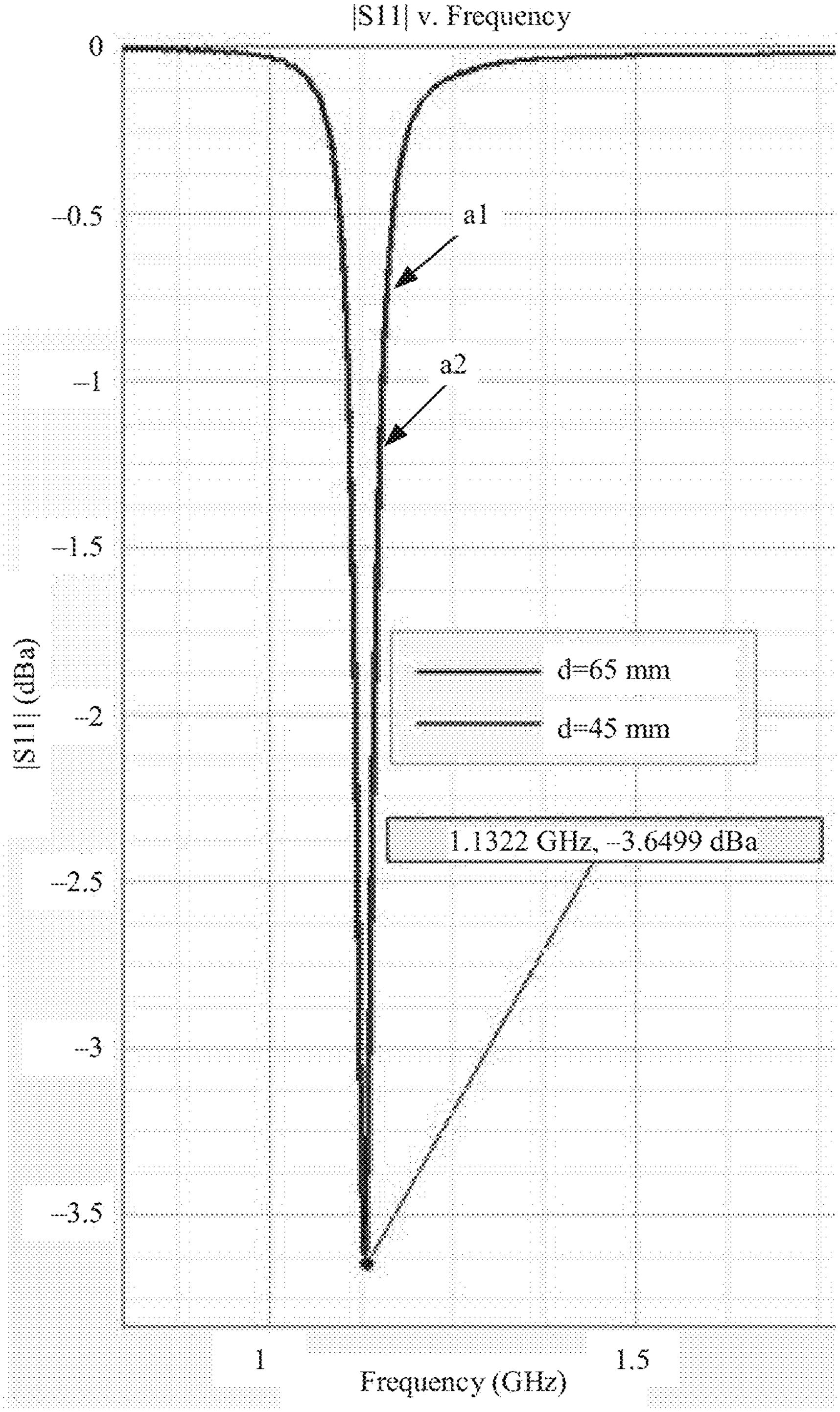
FIG. 5B is a schematic diagram of S11 simulation of an antenna structure at several p values according to this application.
Figure 5C:
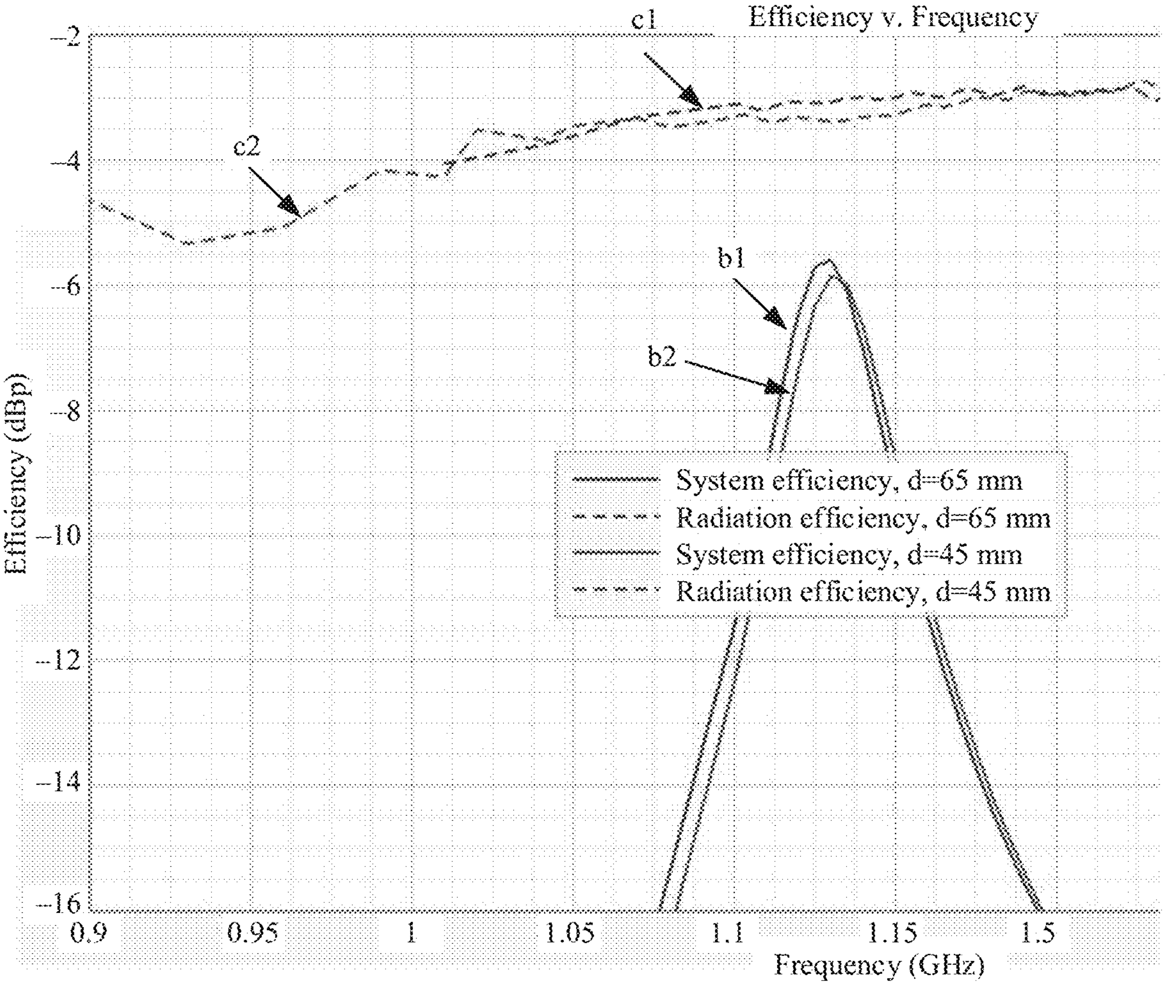
FIG. 5C is a schematic diagram of efficiency simulation of an antenna structure at several p values according to this application.

For example, the distance p between the exciting element 23 shown in FIG. 5A and the bottom side 21-7 of the ground plane 15 is an important parameter of the exciting element 23 in the actual overall system model. It is assumed that Lg=140 mm, Wg=70 mm, Le=40 mm, and h=4 mm. Using a GPS L5 operating band as an example, FIG. 5B and FIG. 5C show S11 simulation and antenna efficiency of an antenna apparatus w % ben p is two different values. When p=65 mm, S11 simulation of the antenna apparatus may be shown by curve a1 in FIG. 5B, and system efficiency and radiation efficiency of the antenna apparatus may be shown by curves b1 and c1 in FIG. 5C. When p=45 mm, S11 simulation of the antenna apparatus may be shown by curve a2 in FIG. 5C, and system efficiency and radiation efficiency of the antenna apparatus may be shown by curves b2 and c2 in FIG. 5C.

It can be seen that a resonance position and a resonance depth of S11 simulation are basically the same when p=65 mm and p=45 mm, and peak system efficiency is about −6 dB. System efficiency when P=65 mm is slightly higher than that when P=45 mm. The reasons will be analyzed in the following content. In addition, an upper hemisphere proportion is about 45.18% when p=65 mm and 55.88% when p=65 mm. A higher upper hemisphere proportion indicates stronger radiation in a longitudinal direction of the antenna, namely, stronger radiation in the Z direction.

Apart from the distance p between the exciting element 23 and the bottom side 21-1 of the ground plane 15, the size of the ground plane 15, the size of the exciting element 23, and the distance w between the exciting element 23 and the lateral side 21-1 of the ground plane 15 may also be important parameters of the antenna apparatus provided in this application in an actual overall system model. Values of these parameters affect antenna performance. The following describes impact of a parameter on antenna performance in detail by using a single variable as a principle (namely, a single parameter is changed and other parameters remain unchanged).

(1) Impact of the Size of the Exciting Element 23 on Antenna Performance

If the length Le of the exciting element 23 increases, the resonance of the antenna is at a lower band, and the resonance depth becomes deeper. If the length Le of the exciting element 23 decreases, the resonance of the antenna is at a higher band, and the resonance depth becomes lower.

Figure 6A:
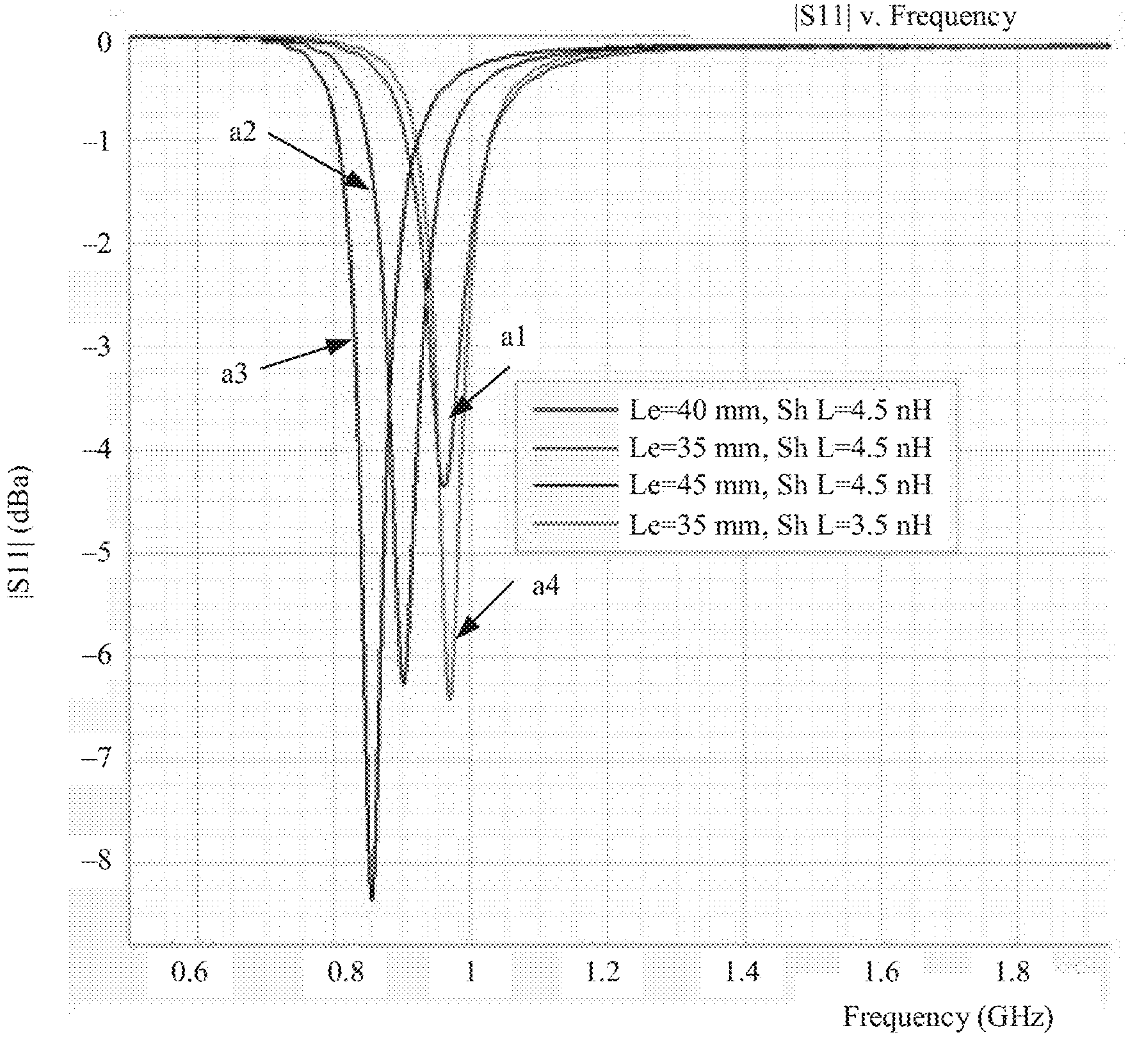
FIG. 6A is a schematic diagram of S11 simulation of an antenna structure at several Le values according to this application.
Figure 6B:
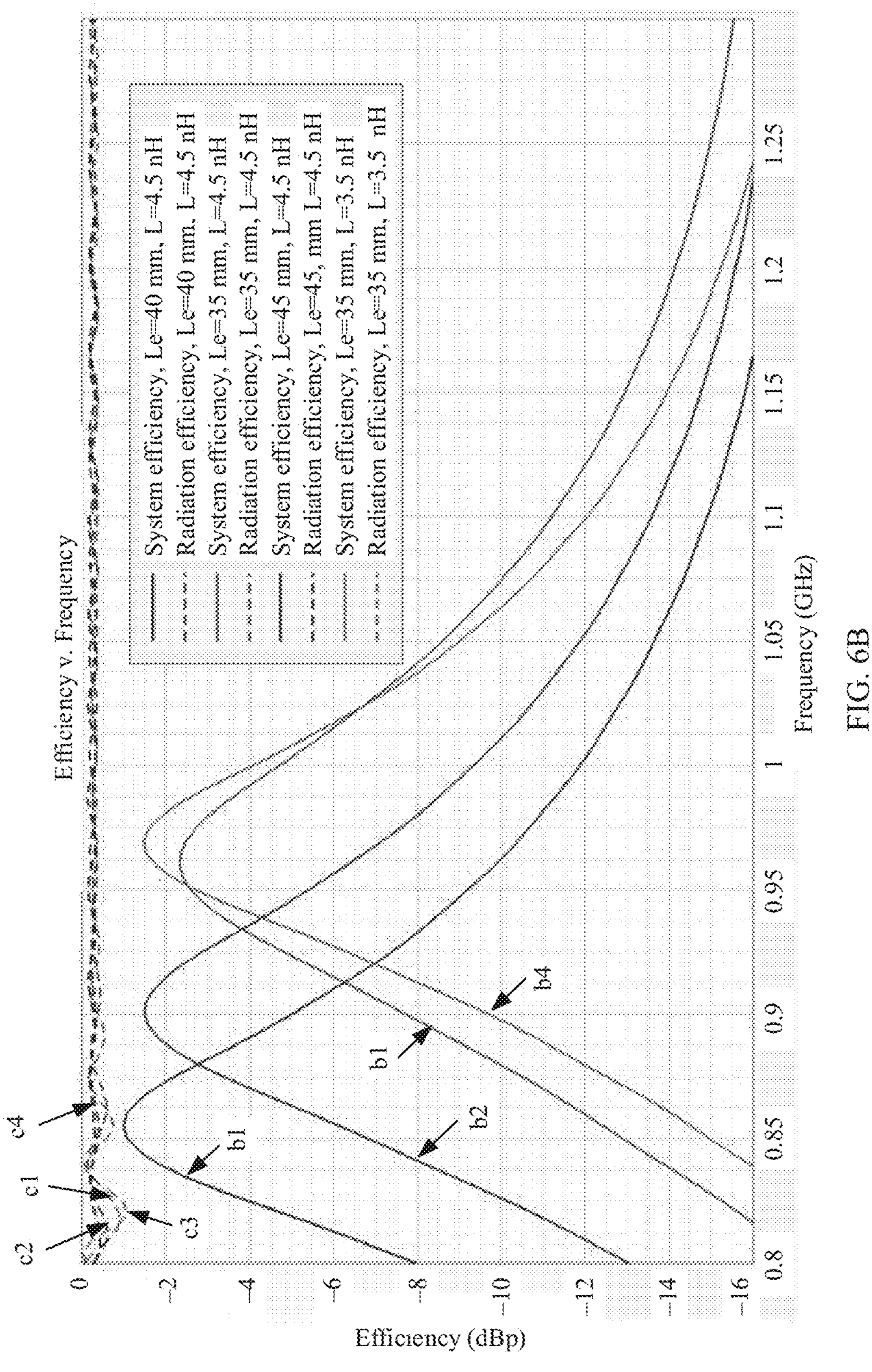
FIG. 6B is a schematic diagram of efficiency simulation of an antenna structure at several Le values according to this application.

For example, using a 900 MHz operating band as an example, FIG. 6A and FIG. 6B show S11 simulation and antenna efficiency of an antenna apparatus when Le is several different values. When Le=35 mm, S11 simulation of the antenna apparatus may be shown by curve a1 in FIG. 6A, and system efficiency and radiation efficiency of the antenna apparatus may be shown by curves b1 and c1 in FIG. 6B. When Le=40 mm, S11 simulation of the antenna apparatus may be shown by curve a2 in FIG. 6A, and system efficiency and radiation efficiency of the antenna apparatus may be shown by curves b2 and c2 in FIG. 6B. When Le=45 mm, S11 simulation of the antenna apparatus may be shown by curve a3 in FIG. 6A, and system efficiency and radiation efficiency of the antenna apparatus may be shown by curves b3 and c3 in FIG. 6B.

Among the antenna performance at the different Les, when Le=45 mm, the antenna apparatus has the lowest resonance frequency (closest to 850 MHz), and the highest resonance depth (up to −8 dB). When Le=35 mm, the antenna apparatus has the highest resonance frequency (closest to 1 GHz) and the lowest resonance depth (about −4 dB). It can be seen that as the length Le becomes shorter from 45 mm to 40 mm and 35 mm, the resonance of the antenna moves towards a high frequency and the resonance depth becomes lower.

For a case in which the resonance becomes lower because the length Le of the exciting element 23 is reduced, the resonance depth may be increased by reducing the parallel inductor. For example, as shown in FIG. 6A and FIG. 6B, curve a4 represents S11 simulation of the antenna apparatus when Le=35 mm and L=3.5 nH, and curves b4 and c4 represent system efficiency and radiation efficiency of the antenna apparatus when Le=35 mm and L=3.5 nH. It can be seen that the parallel inductor L is reduced from L=4.5 nH to L=3.5 nH, so that the depth of the resonance can be increased from −4 dB to −6 dB.

If the height h of the exciting element 23 decreases, the resonance of the antenna moves towards a high frequency, and the resonance depth becomes lower.

Figure 7A:
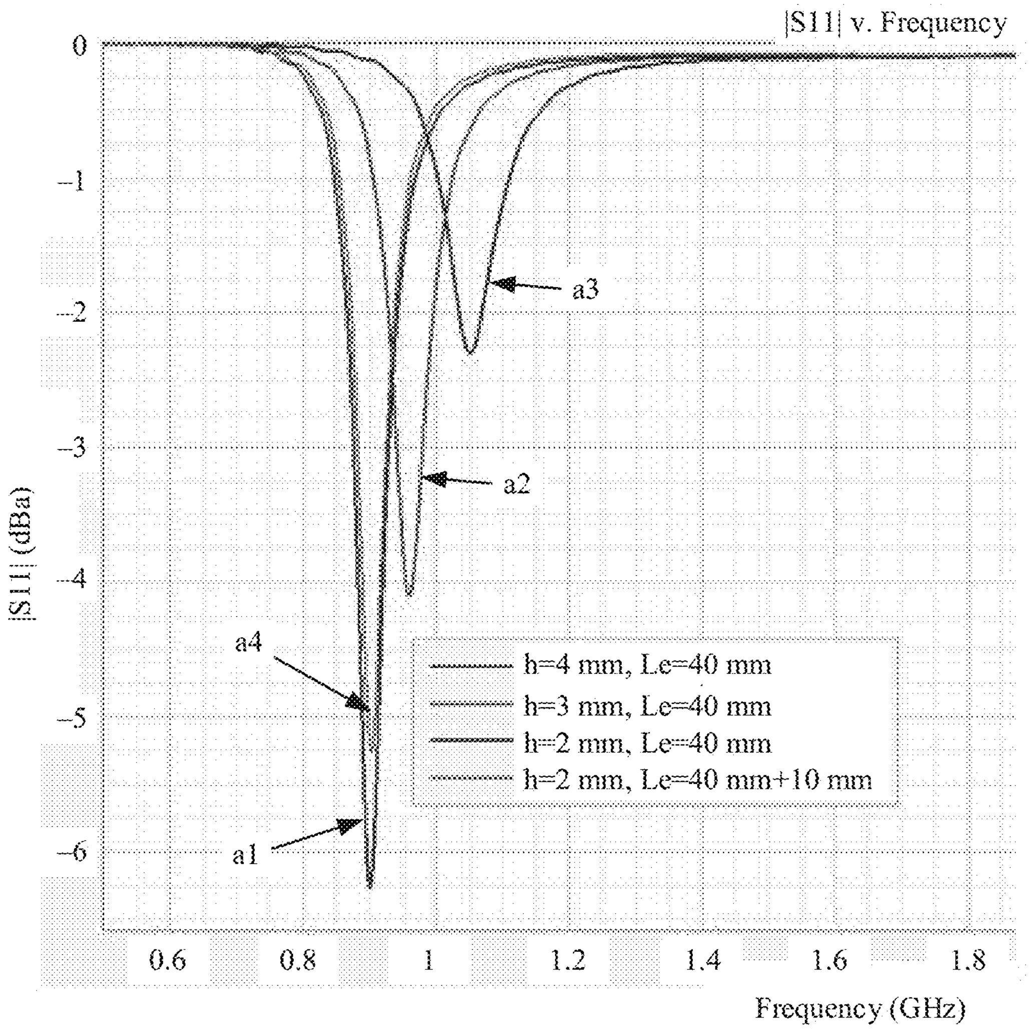
FIG. 7A is a schematic diagram of S11 simulation of an antenna structure at several h values according to this application.
Figure 7B:
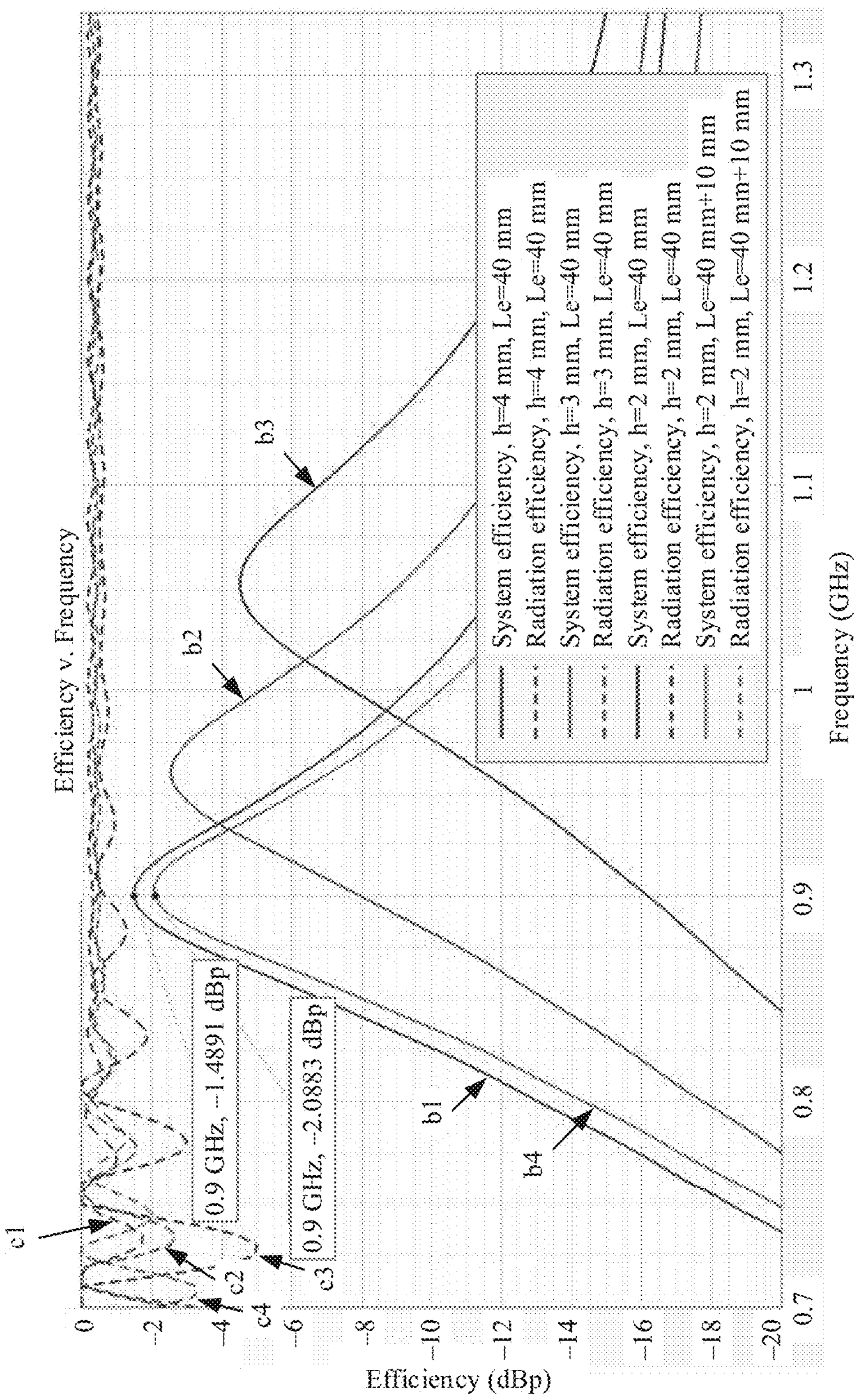
FIG. 7B is a schematic diagram of efficiency simulation of an antenna structure at several h values according to this application.

For example, using a 900 MHz operating band as an example, FIG. 7A and FIG. 7B show S11 simulation and antenna efficiency of an antenna apparatus when h is several different values. When h=4 mm, S11 simulation of the antenna apparatus may be shown by curve a1 in FIG. 7A, and system efficiency and radiation efficiency of the antenna apparatus may be shown by curves b1 and c1 in FIG. 7B. When h=3 mm, S11 simulation of the antenna apparatus may be shown by curve a2 in FIG. 7A, and system efficiency and radiation efficiency of the antenna apparatus may be shown by curves b2 and c2 in FIG. 7B. When h=2 mm. S11 simulation of the antenna apparatus may be shown by curve a3 in FIG. 7A, and system efficiency and radiation efficiency of the antenna apparatus may be shown by curves b3 and c3 in FIG. 7B.

Among the antenna performance at different hs, when h=4 mm, the antenna apparatus has the lowest resonance frequency (about 900 MHz), and the highest resonance depth (up to −7 dB). When h=2 mm, the antenna apparatus has the highest resonance frequency (close to 1 GHz) and the lowest resonance depth (about −4 dB). It can be seen that as the height h decreases from 4 mm to 3 mm and 2 mm, the resonance of the antenna moves towards a high frequency and the resonance depth becomes lower.

For a case in which the resonance moves towards a high frequency because the height h of the exciting element 23 is reduced, the resonance may return to a low frequency by increasing the length Le. For example, as shown in FIG. 7A and FIG. 7B, curve a4 represents S11 simulation of the antenna apparatus when h=2 mm and Le=(40+10) mm, and curves b4 and c4 represent system efficiency and radiation efficiency of the antenna apparatus when h=2 mm and Le=(40+10) mm. It can be seen that the length of the exciting element 23 is increased from 40 mm to (40+10) mm, so that the antenna resonance can return to the low frequency (900 MHz). In this case, the peak efficiency of the antenna is only reduced by about 0.6 dB, there is no significant deterioration, and the antenna bandwidth is also slightly reduced. The antenna performance is not very sensitive to the height of the exciting element 23.

(2) Impact of the Position of the Exciting Element 23 on the Ground Plane 15 on Antenna Performance The position of the exciting element 23 may be embodied by parameters of two dimensions: a distance w between the exciting element 23 and the first side (for example, the lateral side 21-1) of the ground plane, and a distance p between the exciting element 23 and the third side (for example, the bottom side 21-7) of the ground plane. The first side and the third side may be two connected sides of the ground plane 15, and may be perpendicular to each other.

2-A. Impact of the Distance w on Antenna Performance

A smaller distance w indicates that the exciting element 23 is closer to the lateral side 21-1 of the ground plane 15. When w=0 mm, it indicates that the exciting element 23 is set at the lateral side 21-1. A larger distance w indicates that the exciting element 23 is closer to the middle of the ground plane 15 in the Y direction.

Reducing the distance w may cause the resonance of the antenna to move towards the low frequency, and increase the resonance depth. Increasing the distance w can cause the resonance of the antenna to moves toward the high frequency, and reduce the resonance depth. This is because an intrinsic current of the ground plane 15 is mainly concentrated on the ground plane 15 due to the edge effect. When the exciting element 23 moves towards the middle of the ground plane 15 (that is, w becomes larger), the codirectional current on the exciting element 23 is difficult to couple to the intrinsic current of the ground plane 15. Therefore, it is difficult to excite the ground plane 15 to generate radiation.

Figure 8A:
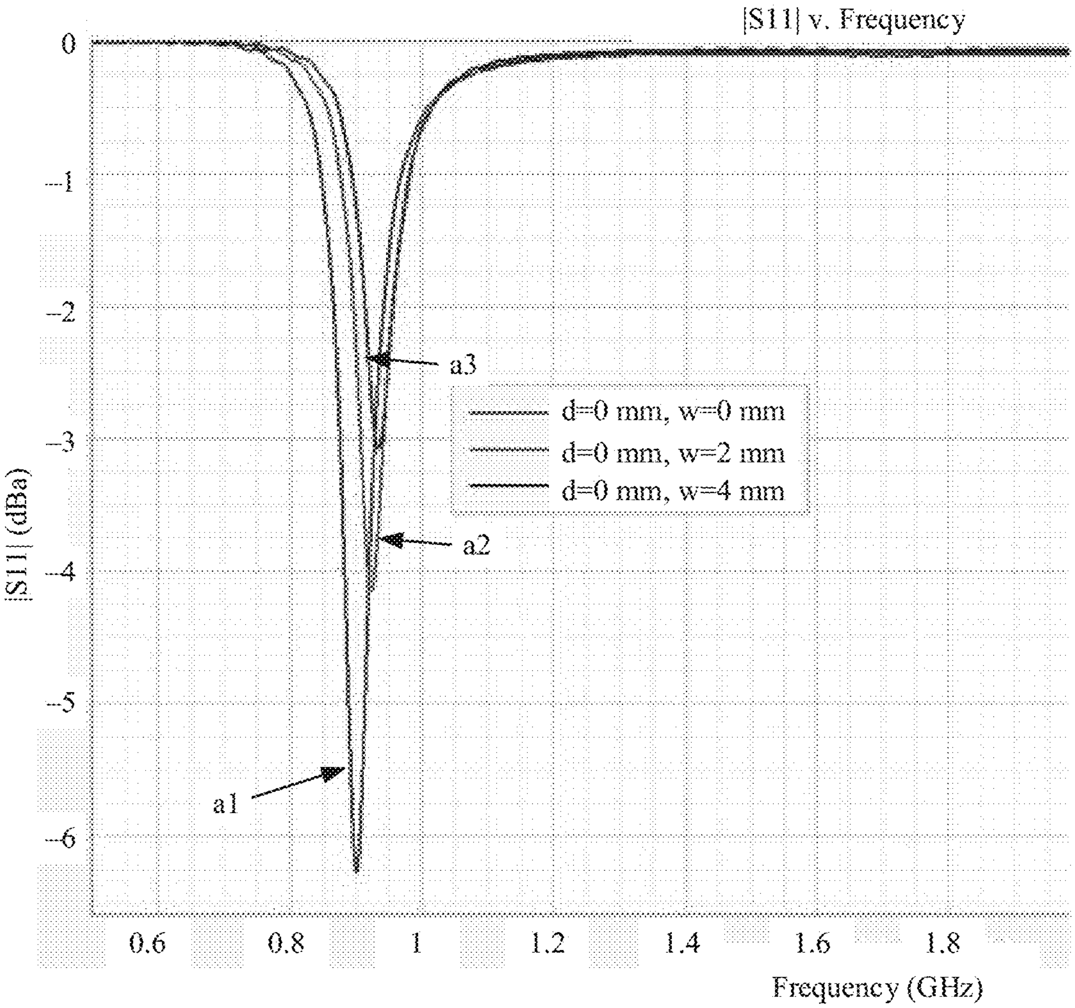
FIG. 8A is a schematic diagram of S11 simulation of an antenna structure at several w values according to this application.
Figure 8B:
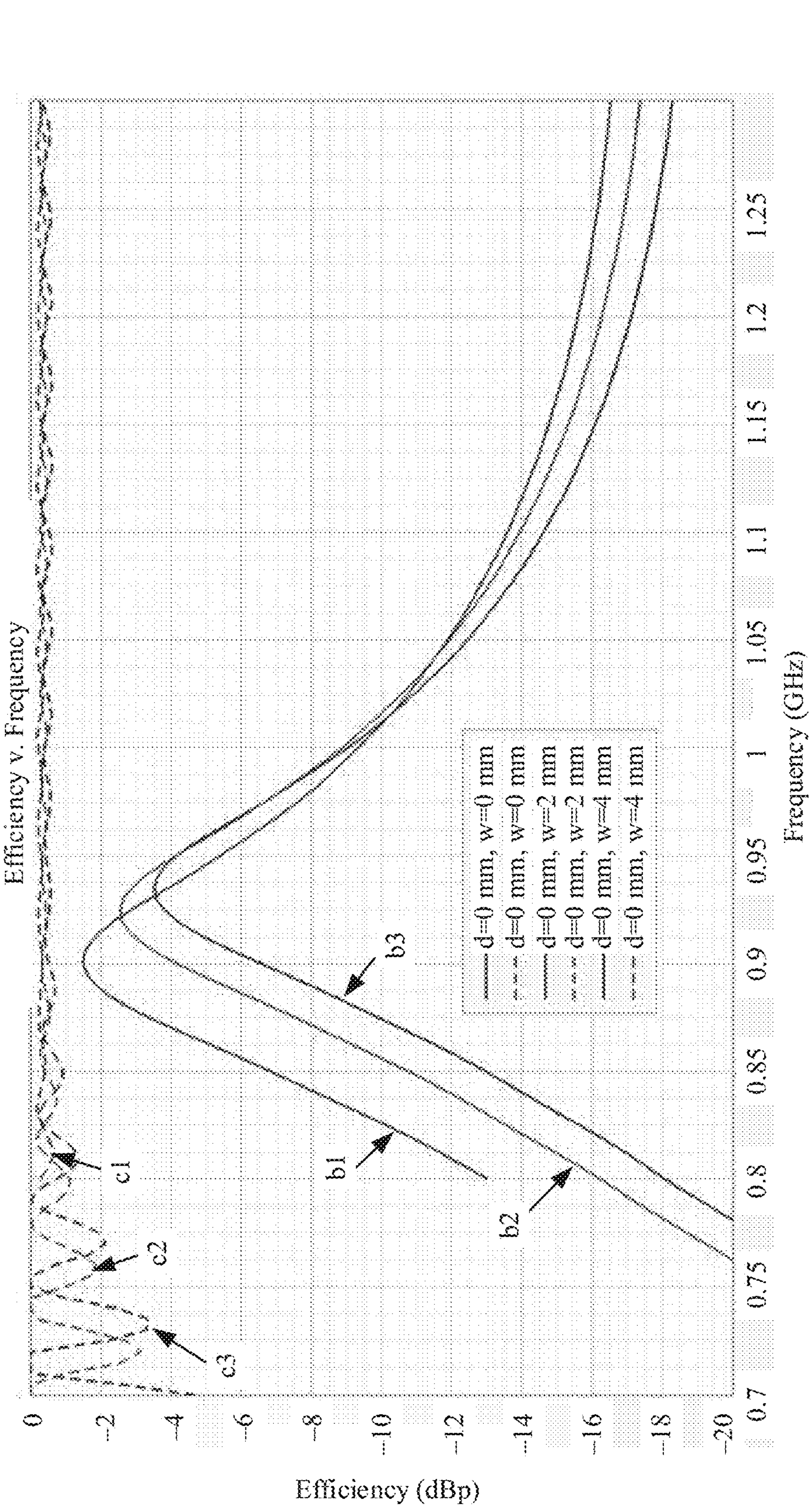
FIG. 8B is a schematic diagram of efficiency simulation of an antenna structure at several w values according to this application.

For example, using a 900 MHz operating band as an example, FIG. 8A and FIG. 8B show S11 simulation and antenna efficiency of an antenna apparatus when w is several different values. In FIG. 8A and FIG. 8B, d=0 mm (d represents a height of a metal bezel) indicates that no metal bezel is disposed at lateral sides of the ground plane 15, namely, the bezel 17 is a non-metal bezel. When w=0 mm, S11 simulation of the antenna apparatus may be shown by curve a1 in FIG. 8A, and system efficiency and radiation efficiency of the antenna apparatus may be shown by curves b1 and c1 in FIG. 8B. When w=2 mm, S11 simulation of the antenna apparatus may be shown by curve a2 in FIG. 8A, and system efficiency and radiation efficiency of the antenna apparatus may be shown by curves b2 and c2 in FIG. 8B. When w=4 mm, S11 simulation of the antenna apparatus may be shown by curve a3 in FIG. 8A, and system efficiency and radiation efficiency of the antenna apparatus may be shown by curves b3 and c3 in FIG. 8B.

Among the antenna performance at different ws, when w=0 mm, the antenna apparatus has the lowest resonance frequency (about 900 MHz), and the lowest resonance depth (up to −6 dB). When w=4 mm, the antenna apparatus has the highest resonance frequency (close to 1 GHz), and the lowest resonance depth (about −3 dB). It can be seen that as the height w increases from 0 mm to 2 mm and 4 mm, the resonance of the antenna moves towards high frequency, and the resonance depth becomes lower, and the peak efficiency and bandwidth of the system also decrease significantly.

In addition, a metal bezel (d is not equal to 0) is disposed at lateral sides of the ground plane 15, so that the resonance of the antenna moves towards high frequency, and the resonance depth becomes lower. This is because the metal bezel may be equivalent to an epitaxy of the ground plane 15, and the intrinsic current of the ground plane 15 is mainly concentrated on the metal bezel due to the edge effect. This is equivalent to outward expansion of the ground plane 15. In this case, the system efficiency peak and bandwidth of the antenna also decrease.

Figure 9A:
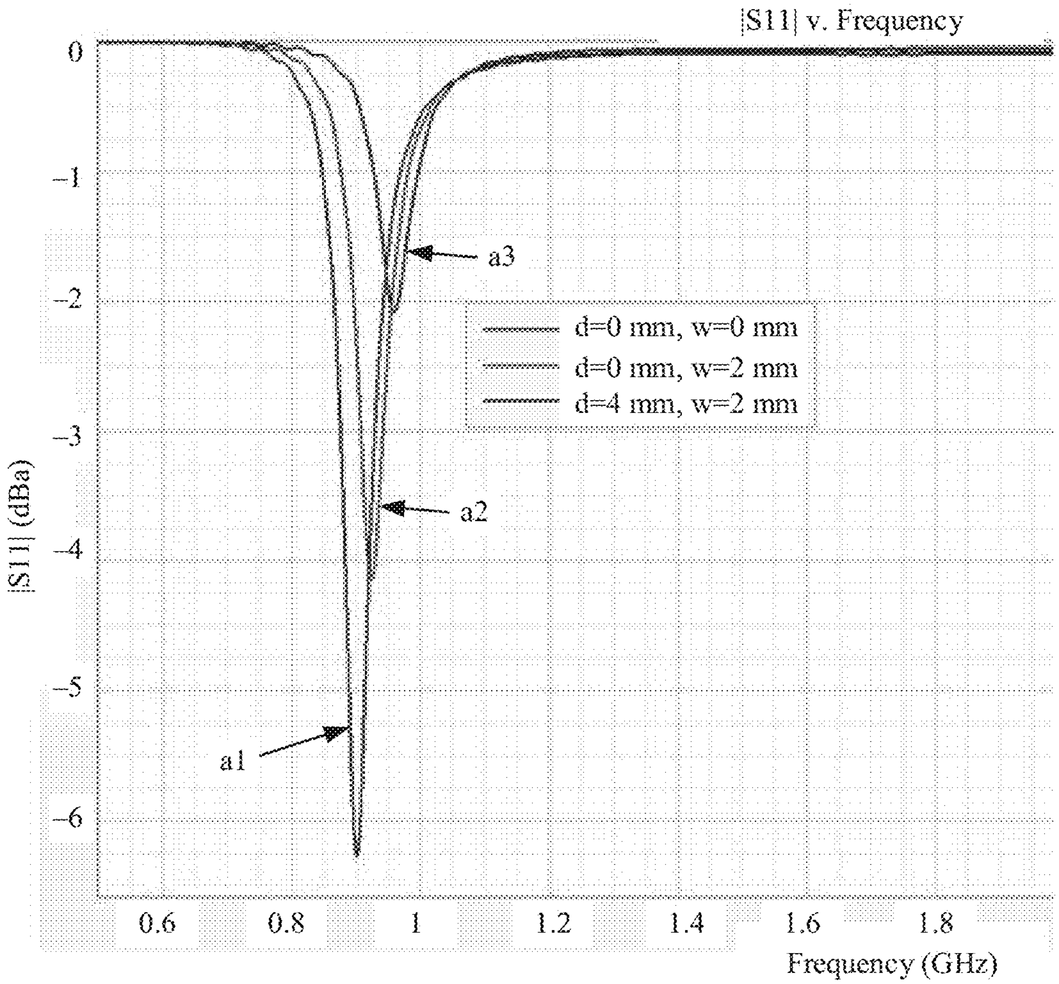
FIG. 9A is a schematic diagram of S11 simulation of an antenna structure when d=4 mm and w=2 mm according to this application.
Figure 9B:
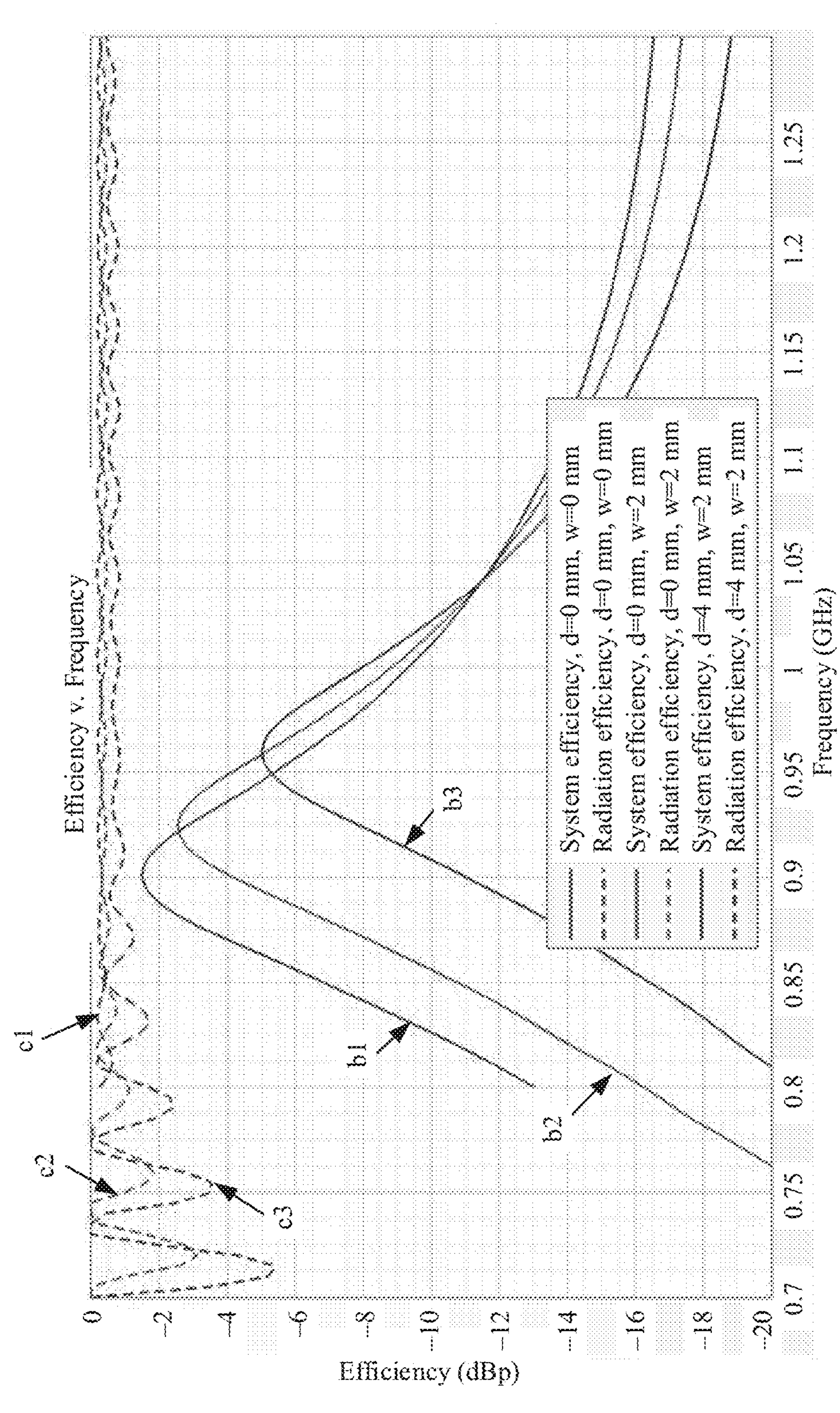
FIG. 9B is a schematic diagram of efficiency simulation of an antenna structure when d=0 mm and w=2 mm according to this application.

For example, using a 900 MHz operating band as an example, as shown in FIG. 9A and FIG. 9B, when d=4 mm (d represents a height of a metal bezel) and w=2 mm. S11 simulation of the antenna apparatus may be shown by curve a3 in FIG. 9A, and system efficiency and radiation efficiency of the antenna apparatus may be shown by curves b3 and c3 in FIG. 9B. When d=0 mm (d represents a height of the metal bezel) and w=2 mm. S11 simulation of the antenna apparatus may be shown by curve a2 in FIG. 9A, and system efficiency and radiation efficiency of the antenna apparatus may be shown by curves b2 and c2 in FIG. 9B. It can be seen that, when both ws are 2 mm, antenna performance when d=4 mm is clearly weaker than antenna performance when d=0 mm. The resonance moves towards high frequency, the resonance depth becomes lower, and the peak system efficiency and bandwidth clearly decrease.

2-B. Impact of the Distance p on Antenna Performance

A smaller distance p indicates that the exciting element 23 is closer to the bottom side 21-7 of the ground plane 15. A larger distance p indicates that the exciting element 23 is farther away from the bottom side 21-7 of the ground plane 15 in the Z direction.

Assuming that the length Lg of the ground plane 15 is 140 mm, and the length of the exciting element 23 is 40 mm, when p=50 mm, p=(Lg−Le)/2. This may indicate that the exciting element 23 is disposed in the middle of the ground plane 15 in the Z direction. Increasing p (for example, p=50 mm+10 mm) or decreasing p (for example, p=50 mm-10 mm) causes the exciting element 23 to deviate from the middle of the ground plane 15. This may result in a lower resonance depth of the antenna, smaller peak efficiency of the system, and a smaller bandwidth. This is because the ground plane 15 has the strongest intrinsic current in the middle of the ground plane 15 in the Z direction, and the intrinsic current becomes weaker at positions away from the middle. When the exciting element 23 is away from the middle of the ground plane 15 in the Z direction, coupling between the codirectional current on the exciting element 23 and the intrinsic current of the ground plane 15 becomes weaker, and the ground plane 15 is unlikely to be excited to generate radiation, causing poor antenna performance.

Figure 10A:
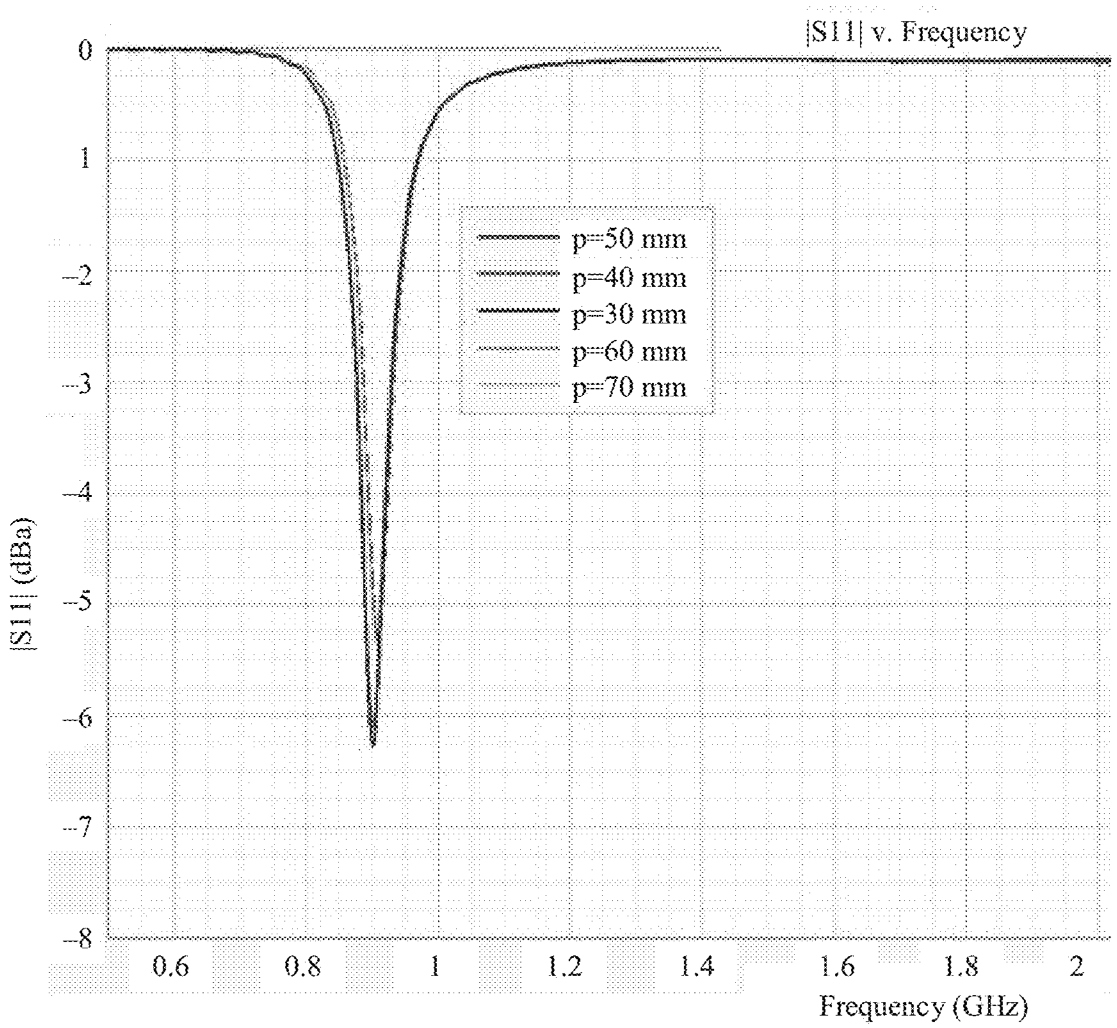
FIG. 10A is a schematic diagram of S11 simulation of an antenna structure at several p values according to this application.
Figure 10B:
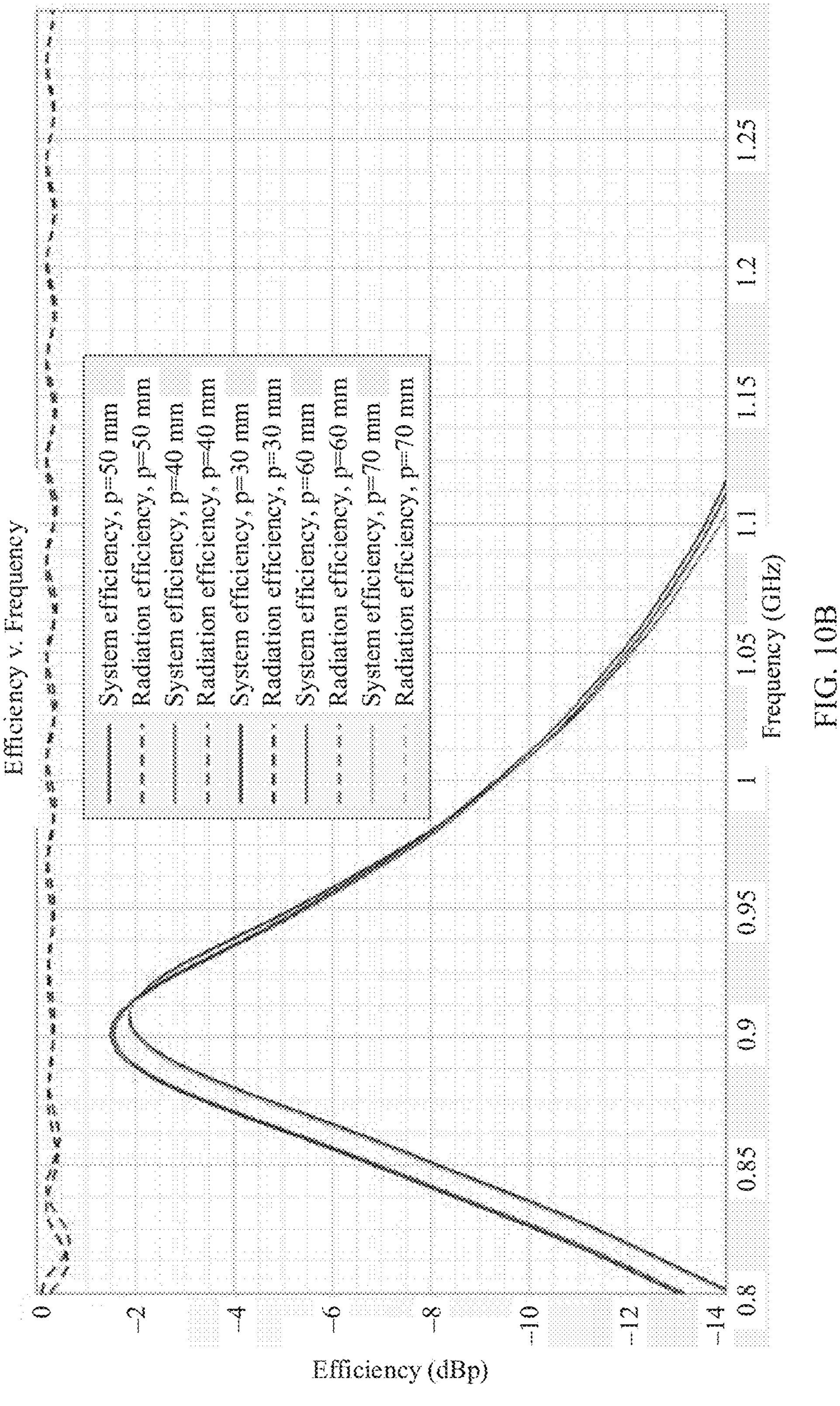
FIG. 10B is a schematic diagram of efficiency simulation of an antenna structure at several p values according to this application.

For example, using a 900 MHz operating band as an example, FIG. 10A and FIG. 10B show S11 simulation and antenna efficiency of an antenna apparatus when p is several different values. It can be seen that when p=50 mm, the antenna has the highest resonance depth, and the largest peak system efficiency and bandwidth. When p=40 mm, p=60 mm, p=30 mm, and p=70 mm, the resonance depth of the antenna becomes lower, and the peak system efficiency and bandwidth become smaller.

In addition, a closer proximity of the exciting element 23 to the bottom side 21-7 of the ground plane 15 (namely, a smaller p) indicates a larger upper hemisphere proportion of the antenna radiation pattern, and stronger radiation in the longitudinal direction of the antenna, namely, stronger radiation in the Z direction. A longer distance between the exciting element 23 and the bottom side 21-7 of the ground plane 15 (that is, a larger p) indicates a smaller upper hemisphere proportion of the antenna radiation pattern, and weaker radiation in the longitudinal direction of the antenna, namely, weaker radiation in the Z direction.

Figure 10C:
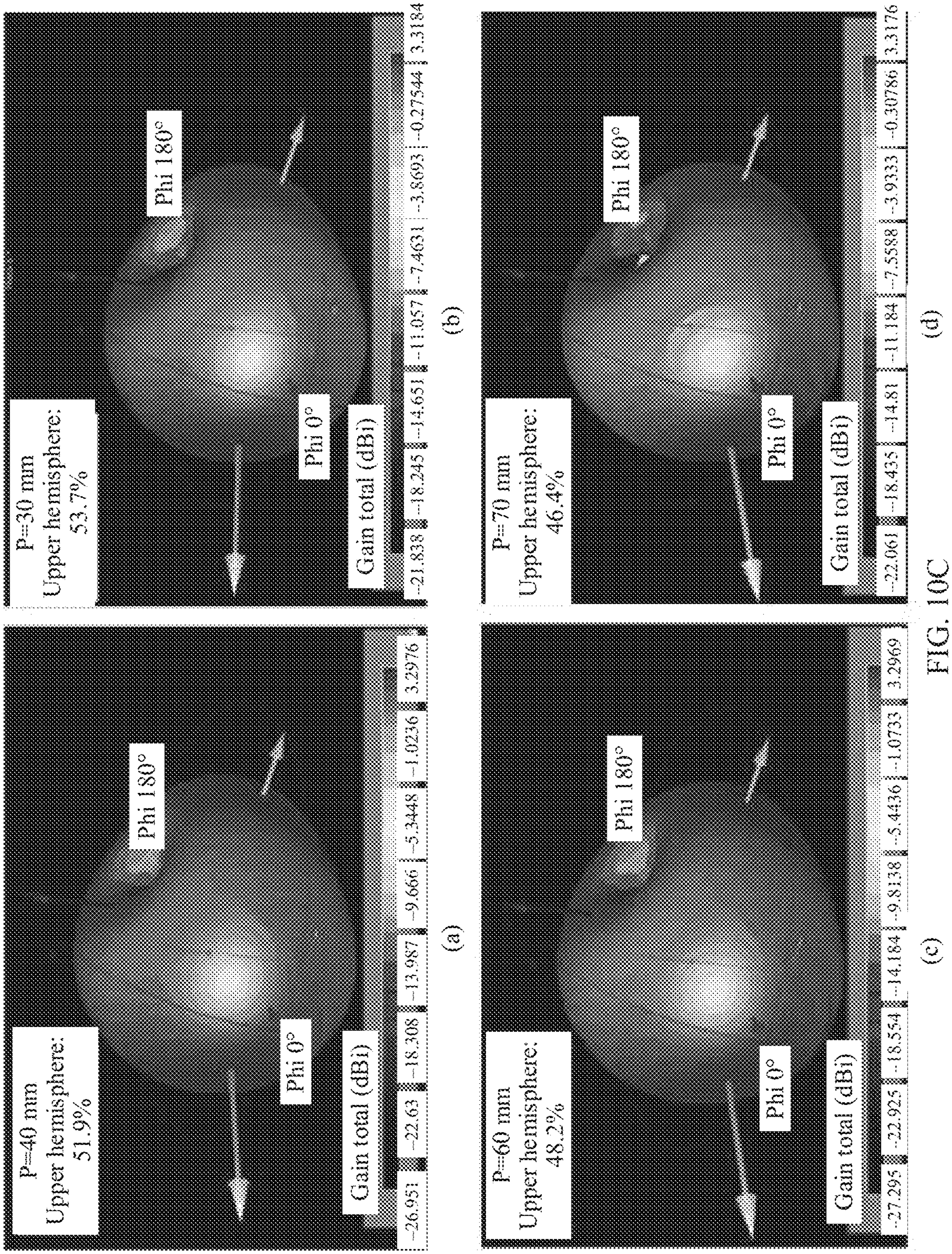
FIG. 10C is an antenna radiation pattern of an antenna structure at several p values according to this application.

For example, using a 900 MHz operating band as an example, FIG. 10C is an antenna radiation pattern of an antenna apparatus when p is several different values. As shown in FIG. 10C, when p=50 mm, the upper hemisphere proportion is 50%; when p=40 mm, the upper hemisphere proportion is 51.9%; when p=30 mm, the upper hemisphere proportion is 53.7%; when p=60 mm, the upper hemisphere proportion is 48.2%; and when p=70 mm, the upper hemisphere proportion is 46.4%.

(3) Impact of the Size of the Ground Plane 15 on Antenna Performance

The size of the ground plane 15 may be embodied by parameters of two dimensions: a length Lg of the ground plane 15 and a width Wg of the ground plane 15.

3-A. Impact of the Length Lg on Antenna Performance

Figure 11A:
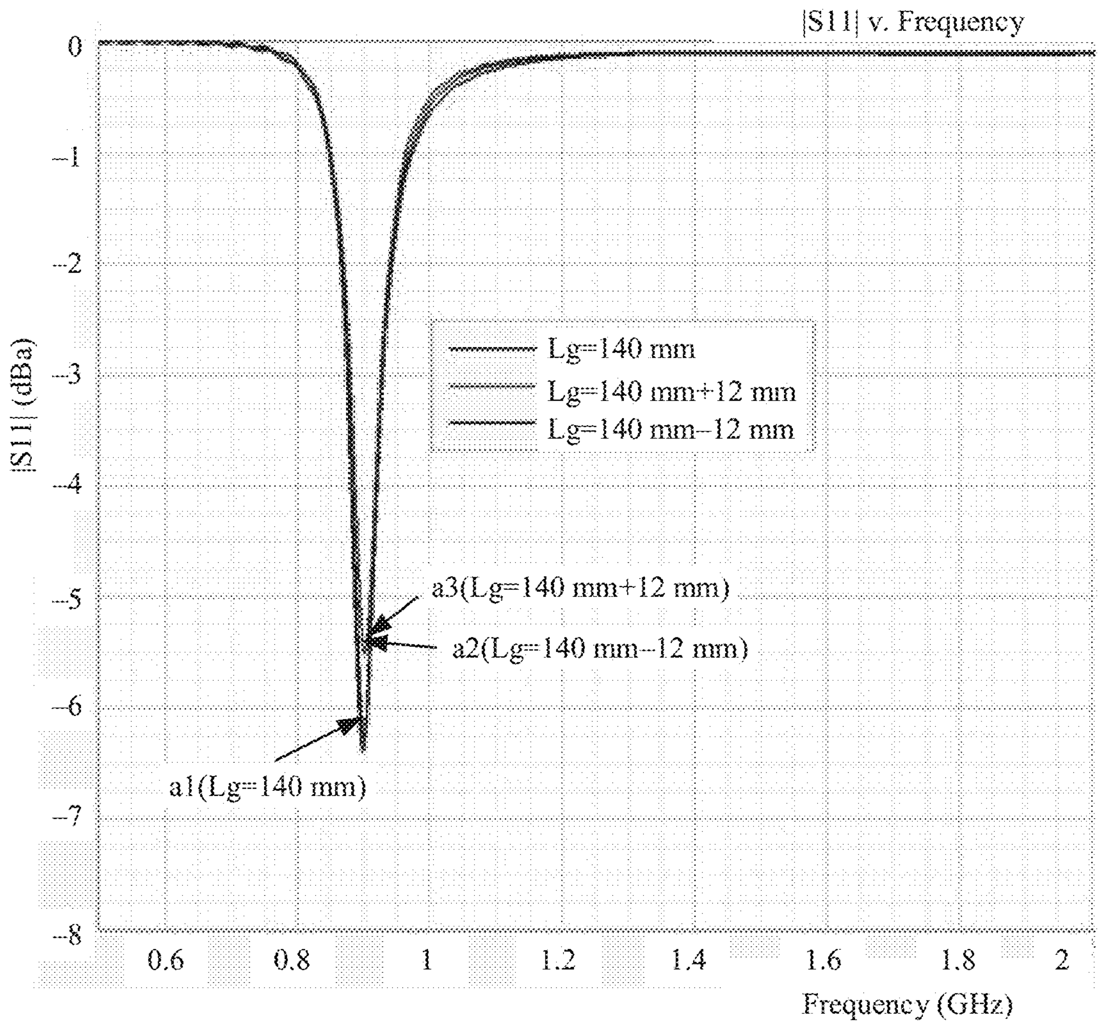
FIG. 11A is a schematic diagram of S11 simulation of an antenna structure at several Lg values according to this application.
Figure 11B:
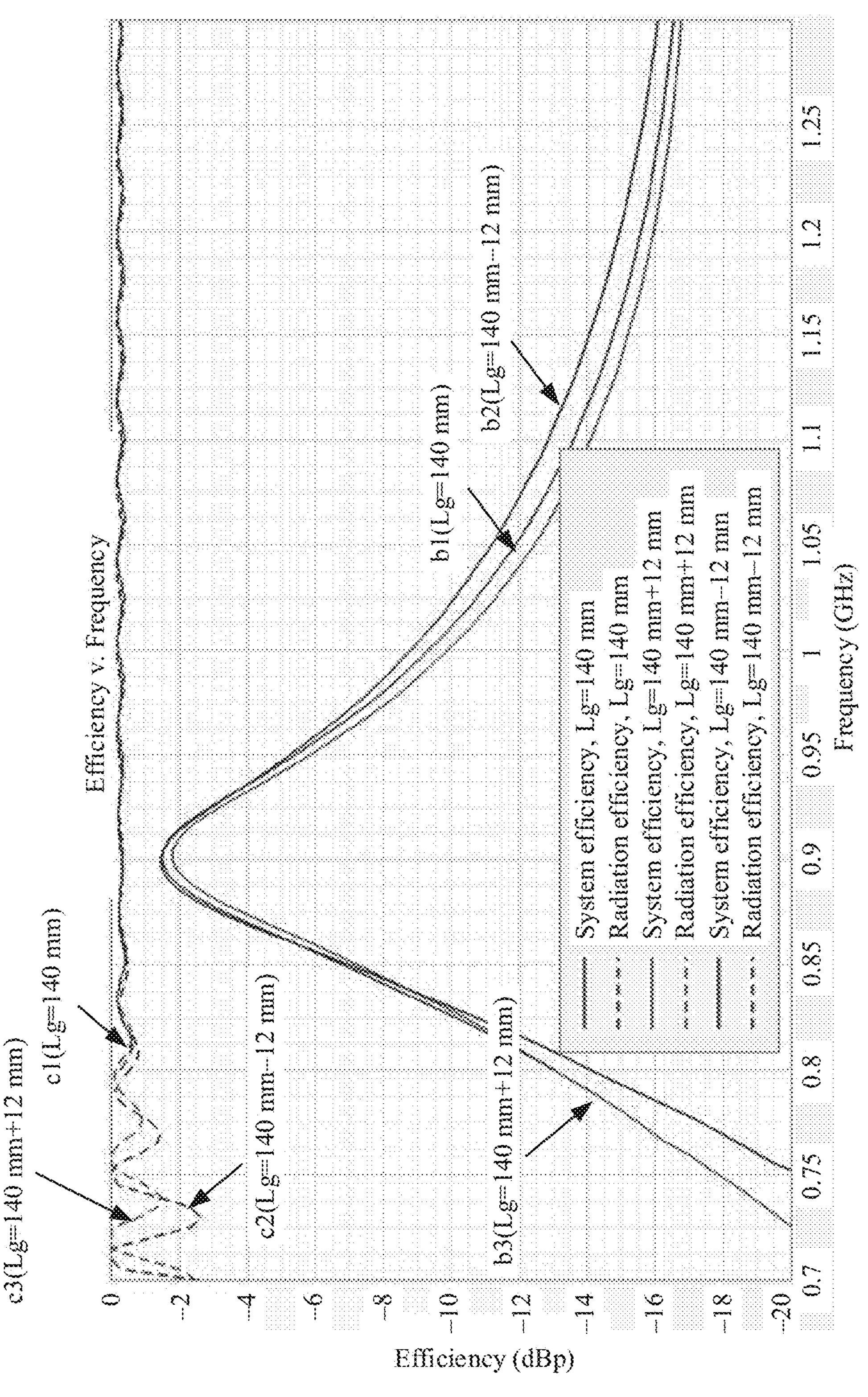
FIG. 11B is a schematic diagram of efficiency simulation of an antenna structure at several Lg values according to this application.

Assuming that Wg=70 mm, as shown in FIG. 11A and FIG. 11B, when Lg is prolonged by 12 mm or shortened by 12 mm based on 140 mm, the resonance position of the antenna is basically unchanged because the width of the ground plane 15 is large and a characteristic impedance of the ground plane 15 is small. Resonance of the antenna apparatus provided in this application is more affected by the length Le of the exciting element 23 because a characteristic impedance of the exciting element 23 is larger.

3-B. Impact of the Width Wg on Antenna Performance

Figure 11C:
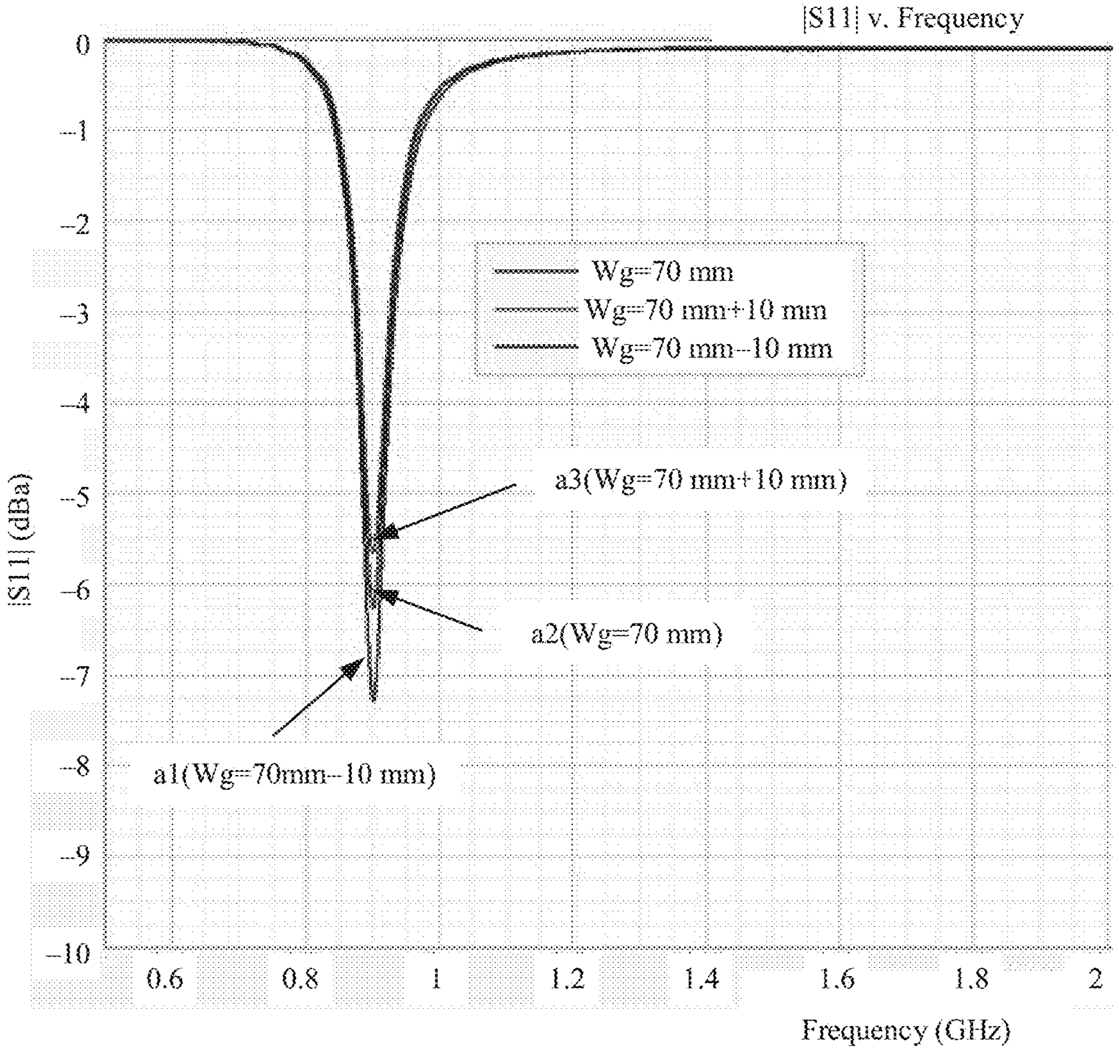
FIG. 11C is a schematic diagram of S11 simulation of an antenna structure at several Wg values according to this application.
Figure 11D:
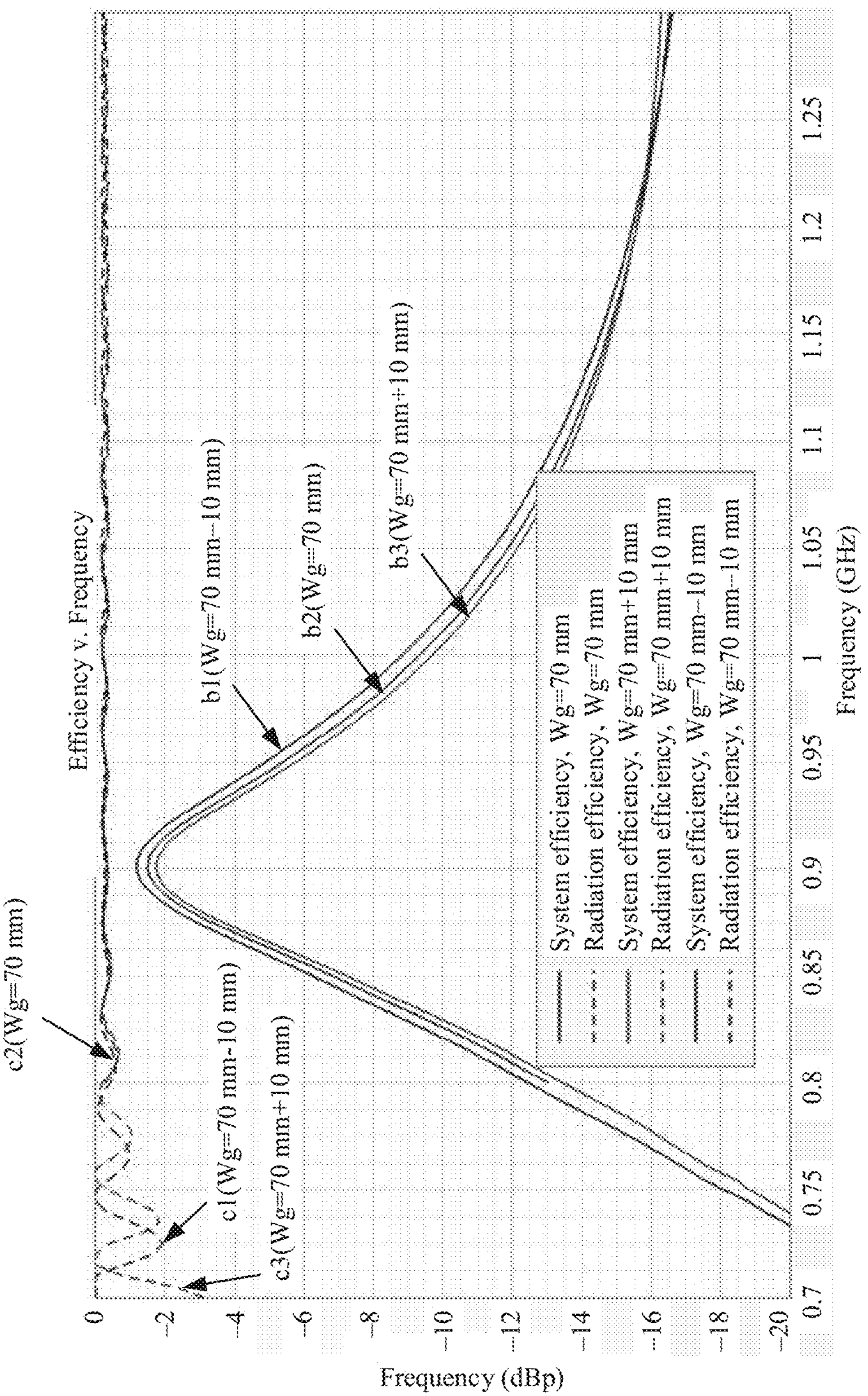
FIG. 11D is a schematic diagram of efficiency simulation of an antenna structure at several Wg values according to this application.

As shown in FIG. 11C and FIG. 11D, when Wg is widened by 10 mm or narrowed by 10 mm based on 70 mm, the resonance position of the antenna is basically unchanged. However, when the ground plane 15 becomes narrower (that is, Wg decreases), the resonance of the antenna becomes deeper, and the system efficiency peak and bandwidth become larger. This is because a narrower ground plane 15 indicates that the intrinsic current of the ground plane 15 is more concentrated on the ground plane 15. In this way, coupling between the ground plane 15 and the exciting element 23 set in proximity to the ground plane 15 is stronger, and the ground plane 15 is more likely to be excited to generate radiation.

Sizes of the exciting element 23 and the ground plane 15 may be determined based on sizes of an overall system model to which the antenna apparatus provided in this application is actually applied. To make the exciting element 23 effectively excite the ground plane 15 to generate radiation, a relative position relationship between the exciting element 23 and the ground plane 15 may be as follows:

1. The exciting element 23 may be parallel to the first side (for example, the lateral side 21-1) of the ground plane 15, or a smaller included angle may be presented between the exciting element 23 and the first side (for example, the lateral side 21-1) of the ground plane 15, the exciting element 23 and the first side of the ground plane 15 may be nearly parallel. The smaller included angle may be less than a first angle, such as 5°. The first angle is not limited to 5°, and may alternatively be an angle such as 3° or 7°. In this case, an included angle $\alpha$ between the exciting element 23 and the first side is less than an included angle $\beta$ between the exciting element 23 and the third side. Particularly, when the included angle $\alpha=0$ and the included angle $\beta=90°$, the exciting element 23 is parallel to the first side. In this case, the exciting element 23 is more likely to excite the ground plane 15 to generate radiation.

2. The exciting element 23 may be set on the ground plane 15 in proximity to the first side (for example, the lateral side 21-1) of the ground plane 15. Herein, the proximity may mean that a distance between the exciting element 23 and the first side is less than a specific distance, for example, 4 mm. The specific distance is not limited to 4 mm, and may alternatively be a value such as 3 mm, 2 mm, or 1 mm. In this case, a distance L1 from the exciting element 23 to the first side is less than a distance L2 from the exciting element 23 to the second side (for example, the lateral side 21-5). The first side and the second side are two opposite sides of the ground plane 15. L1 may be equal to 0. In this case, the exciting element 23 is set at the first side of the ground plane, and the exciting element 23 is more likely to excite the ground plane 15 to generate radiation. In other words, a closer proximity of the exciting element 23 to the first side indicates that the ground plane 15 is more likely to be excited to generate radiation.

It may be understood that when the exciting element 23 is parallel to the first side, the distance between the exciting element 23 and the first side is unique. When the exciting element 23 is nearly parallel to the first side, the distance between the exciting element 23 and the first side may be a distance from a point (for example, a center point) on the exciting element 23 to the first side, or an average value of a plurality of distances from each of a plurality of points on the exciting element 23 to the first side.

3. A difference between a distance p1 from a first end of the exciting element 23 to a third side (for example, a bottom side 21-7) of the ground plane 15 and a distance p2 from a second end of the exciting element 23 to a fourth side (for example, a top side 21-3) of the ground plane 15 is less than a first value, for example, 15 mm. The first value is not limited to 15 mm, and may alternatively be a value such as 12 mm or 20 mm. In addition to the first side (for example, the lateral side 21-1) and the second side (for example, the lateral side 21-5) that are opposite to each other, the third side and the fourth side are the other two opposite sides of the ground plane 15. The first end of the exciting element 23 is an end close to the third side, and the second end of the exciting element 23 is an end close to the fourth side. When the exciting element 23 is parallel to the first side, p1+p2+Le=Lg; and when the exciting element 23 is not parallel to the first side, and an included angle $\alpha$ ($\alpha \neq 0$) exists between the exciting element 23 and the first side, p1+p2+Le>Lg. When the difference between p1 and p2 is 0, the exciting element 23 is more likely to excite the ground plane 15 to generate resonance. In this case, p1 and p2 are equal, and both are equal to (Lg−Le)/2.

The foregoing content describes a design solution of an antenna operating at a single band. The single band may be a 900 MHz low-frequency band, a GPS L5, a GPS L1, or the like. In addition to the single band, the antenna apparatus provided in this application may further implement a dual-band, a wide-band, or a multi-band, and may be implemented by using the matching network or adding more magnetic rings. Details are described below.

Dual-Band Antenna Solution Based on a Matching Network

Figure 12A:
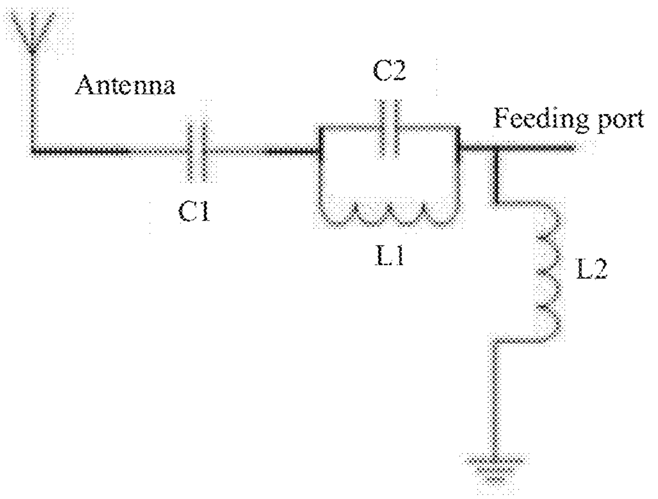
FIG. 12A is a schematic diagram of a dual-band matching network.
Figure 12B:
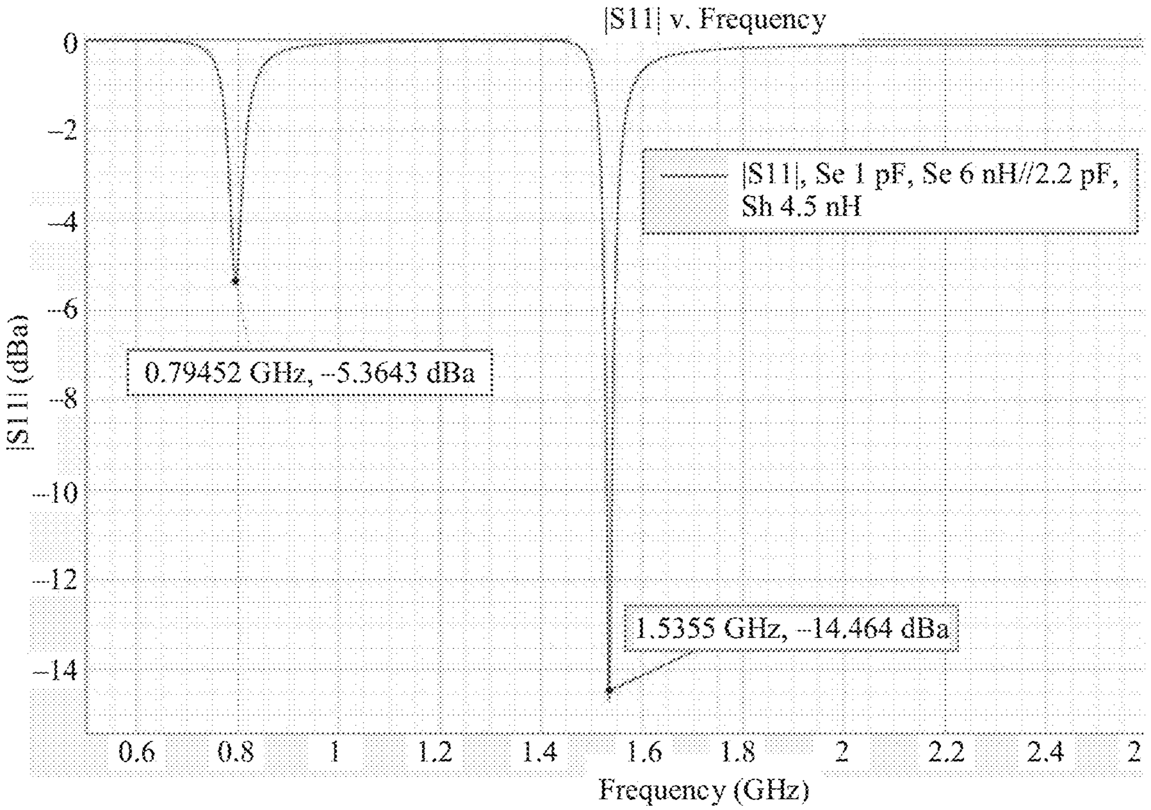
FIG. 12B is an S11 simulation diagram of an antenna structure configured with the matching network shown in FIG. 12A according to this application.

As shown in FIG. 12A, to implement dual-band matching, the matching network may be that an LC parallel circuit (consisting of L2 and C2) is connected in series after a capacitor C1 is connected in series, and finally an inductor L2 is connected in parallel. In other words, the matching network integrated at the feeding port may include: The capacitor C1, the LC parallel circuit, and the inductor L2 are connected in series, the capacitor C1 and the LC parallel circuit are connected in series to the feeding port once, and the inductor L2 is connected in parallel to the feeding port. The capacitor C1 may be referred to as a third capacitor, the inductor L2 may be referred to as a second inductor, the capacitor C2 in the LC parallel circuit may be referred to as a fourth capacitor, and the inductor L2 in the LC parallel circuit may be referred to as a third inductor. Optionally, the dual-band may be a low-band (for example, at 800 MHz) and a GPS L1 band (at 1.5 GHz). A configuration of the matching network for the dual-band may be as follows: C1=1 pF, L1=6 nH, and C2=2.2 pF, L2=4.5 nH. By setting the dual-band matching network at the feeding port, antenna performance of the antenna apparatus provided in this application may be shown in FIG. 12B. FIG. 12B shows S11 simulation of the antenna apparatus.

Figure 13A:
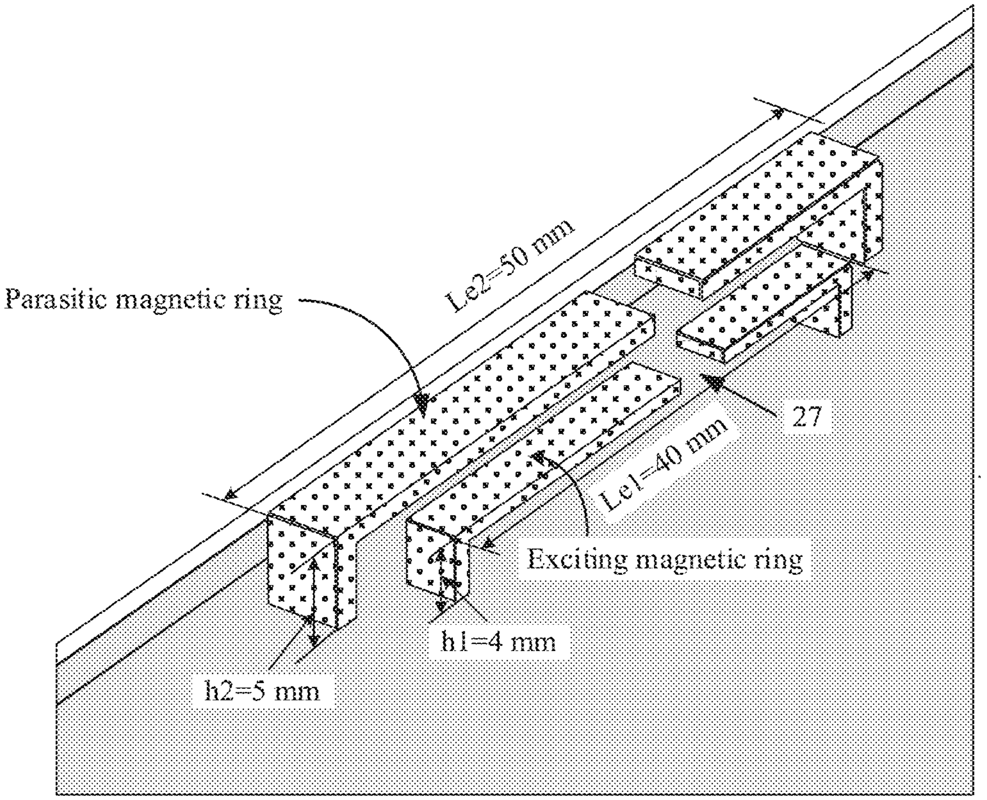
FIG. 13A is a schematic diagram of a multi-band or wide-band antenna structure based on a multi-magnetic ring.
Figure 13B:
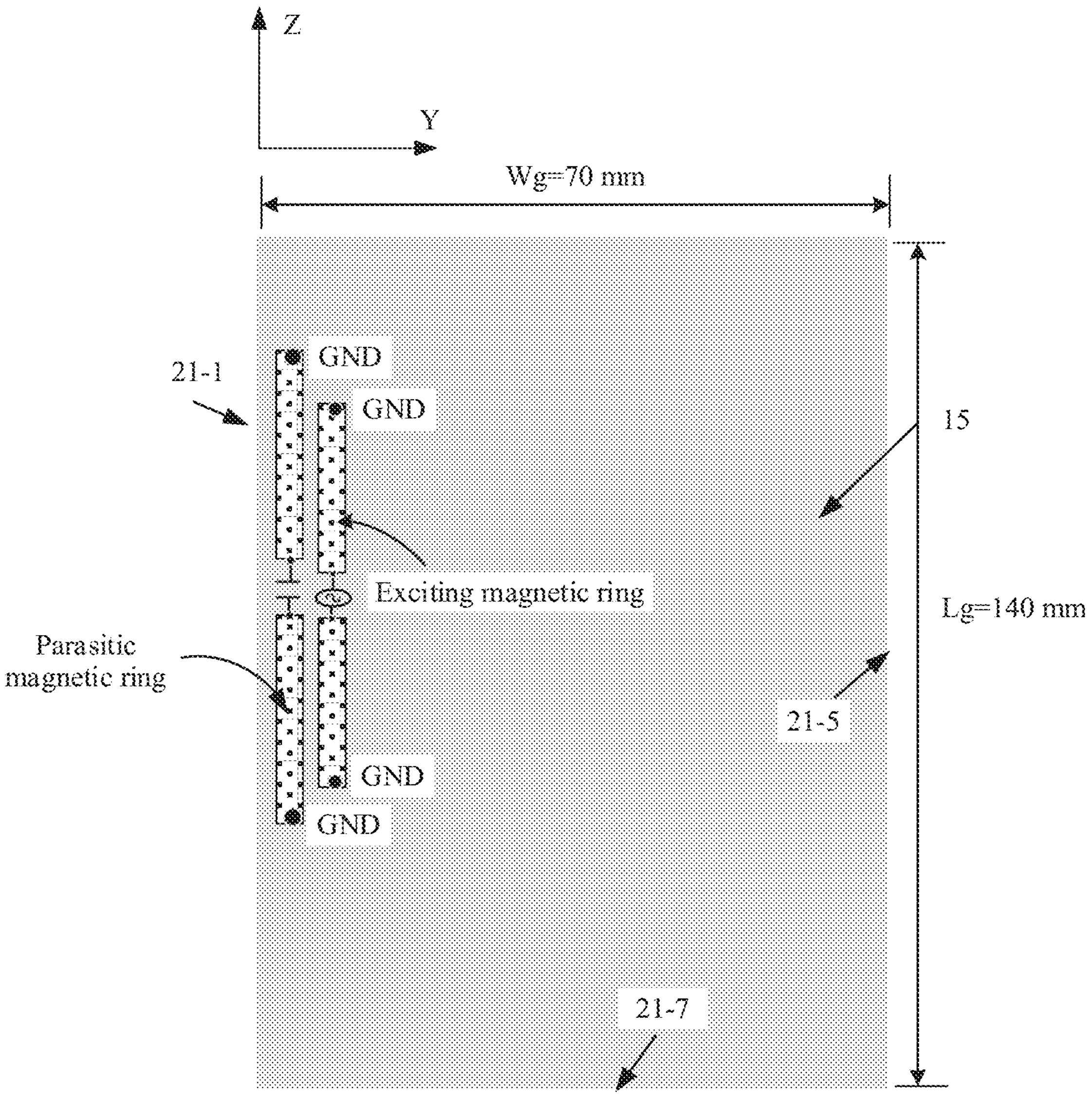
FIG. 13B is a simplified aerial view of the antenna structure shown in FIG. 13A.

Dual-Band, Wide-Band, or Multi-Band Antenna Solution Based on a Multi-Magnetic Ring As shown in FIG. 13A to FIG. 13B, to implement a dual-band or a wide-band, a parasitic element (which may also be referred to as a parasitic magnetic ring) may be set on the ground plane 15. In other words, the antenna apparatus provided in this application may further include a parasitic element. On the ground plane 15, like the exciting element 23, the parasitic element may be set in proximity to the first side (for example, the lateral side 21-1) of the ground plane. Herein, the proximity may mean that a distance between the parasitic element and the first side (for example, the lateral side 21-1) of the ground plane is less than a specific distance (for example, 4 mm). In this case, a distance L3 from the parasitic element to the first side of the ground plane is less than a distance L4 from the parasitic element to the second side of the ground plane.

The parasitic element may have a same structure as the exciting element 23. The parasitic element may have a third branch and two fourth branches. The third branch is similar to the first branch 29-2 in the exciting element 23, and the fourth branches are similar to the second branches 29-1 and 29-3 in the exciting element 23. Similar to the structure of the exciting element 23, the two fourth branches in the parasitic element may be respectively connected to two ends of the third branch. An end of the fourth branch that is away from the first branch is connected to the ground plane 15. The two fourth branches may be used to set the third branch on the ground plane 15, so that a gap is formed between the third branch and the ground plane 15. Like the exciting element 23, a capacitor may be connected in series on the parasitic element. The capacitor may be referred to as a fifth capacitor. To connect the fifth capacitor in series, a gap may be disposed on the third branch, and the fifth capacitor may be connected in series between two parts of the third branch on both sides of the gap. The gap may be referred to as a second slot.

While the exciting element 23 excites the ground plane 15 to generate radiation, the ground plane 15 couples the parasitic element to generate radiation, thereby implementing dual-band radiation.

Figure 13C:
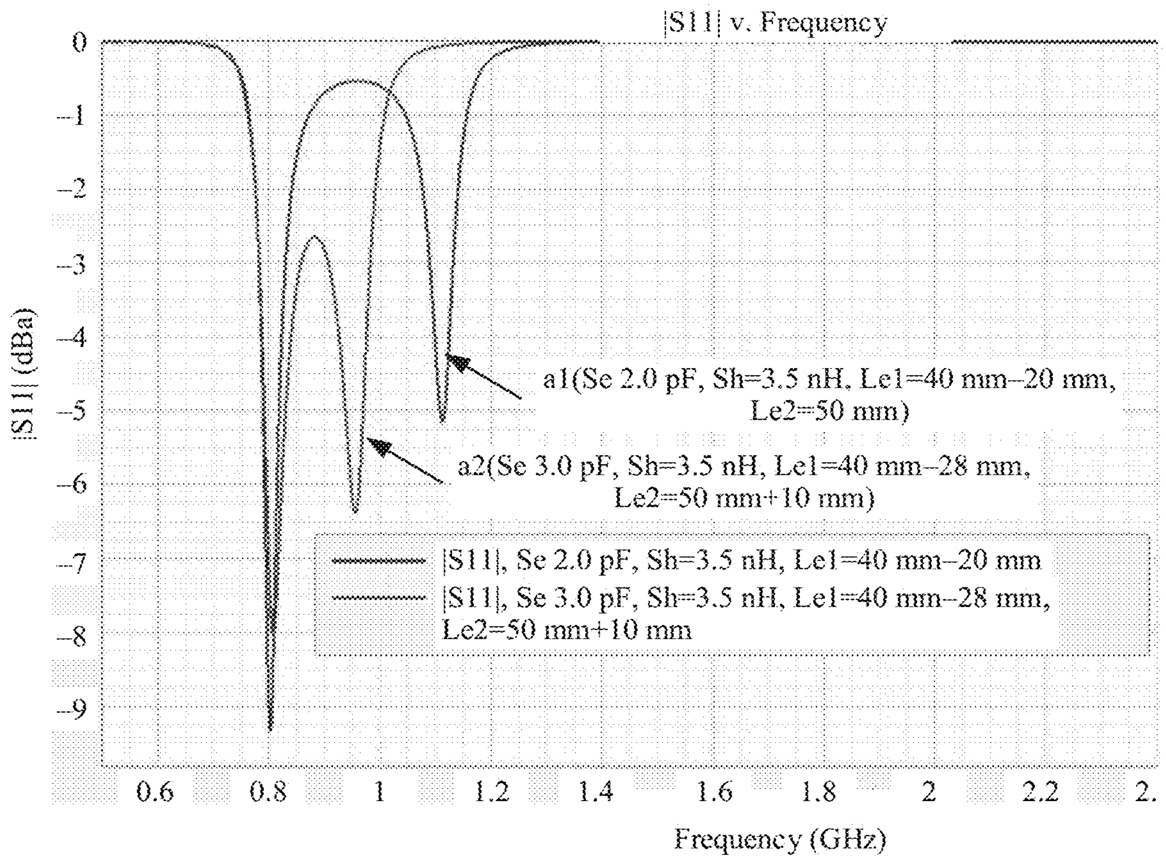
FIG. 13C is an S11 simulation diagram of the antenna structure shown in FIG. 13A at two matching network parameters.
Figure 13D:
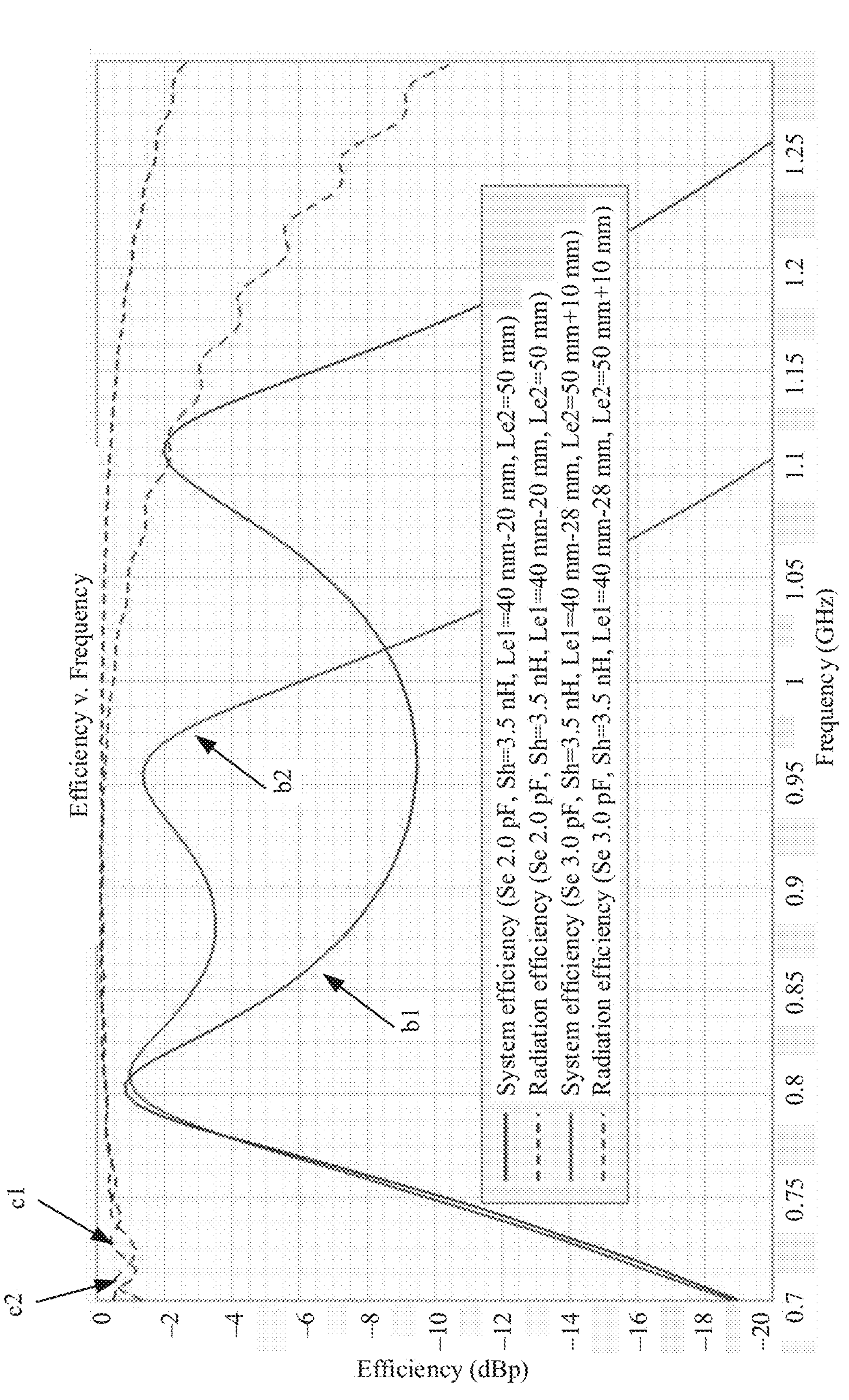
FIG. 13D is an efficiency simulation diagram of the antenna structure shown in FIG. 13A at two matching network parameters.

FIG. 13C and FIG. 13D show antenna performance at two matching network parameters. When the exciting element 23 is connected in series to the capacitor C=2.0 pF, and connected in parallel to the inductor L=3.5 nH, the length of the exciting element 23 is 20 mm, and the length of the parasitic element is 50 mm, S11 simulation of the antenna apparatus may be shown by curve a1 in FIG. 13C, and efficiency simulation of the antenna apparatus may be shown by curves b1 and c1 in FIG. 13D. It can be seen that the antenna apparatus operates in a dual-band: an 800 MHz band and a 960 MHz band, the two bands have basically same antenna efficiency, and have no efficiency dent. When the exciting element 23 is connected in series to the series capacitor C=3.0 pF, and connected in parallel to the inductor L=3.5 nH, the length of the exciting element 23 is 12 mm, and the length of the parasitic element is 60 mm, S11 simulation of the antenna apparatus may be shown by curve a2 in FIG. 13C, and efficiency simulation of the antenna apparatus may be shown by curves b2 and c2 in FIG. 13D. It can be seen that the antenna apparatus operates in a dual-band: an 800 MHz band and a 1.1 GHz band, the two bands have basically same antenna efficiency, and have no efficiency dent.

Figure 14:
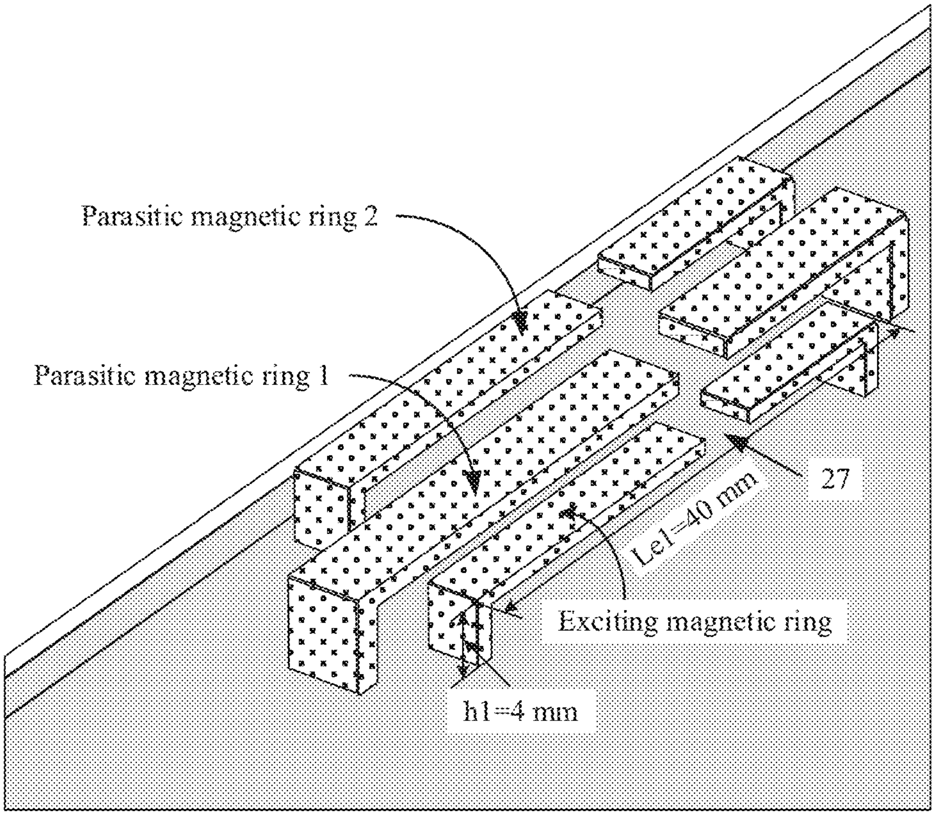
FIG. 14 is another schematic diagram of a multi-band or wide-band antenna structure based on a multi-magnetic ring.

To cover more bands or a wider band, more parasitic magnetic rings may be disposed on the ground plane 15, as shown in FIG. 14. Specifically, three resonant frequencies can be implemented by using two parasitic magnetic rings; four resonant frequencies can be implemented by using three parasitic magnetic rings; and N+1 resonant frequencies can be implemented by using N (N is a positive integer) parasitic magnetic rings. There is a series capacitor on each parasitic magnetic ring.

Figure 15A:
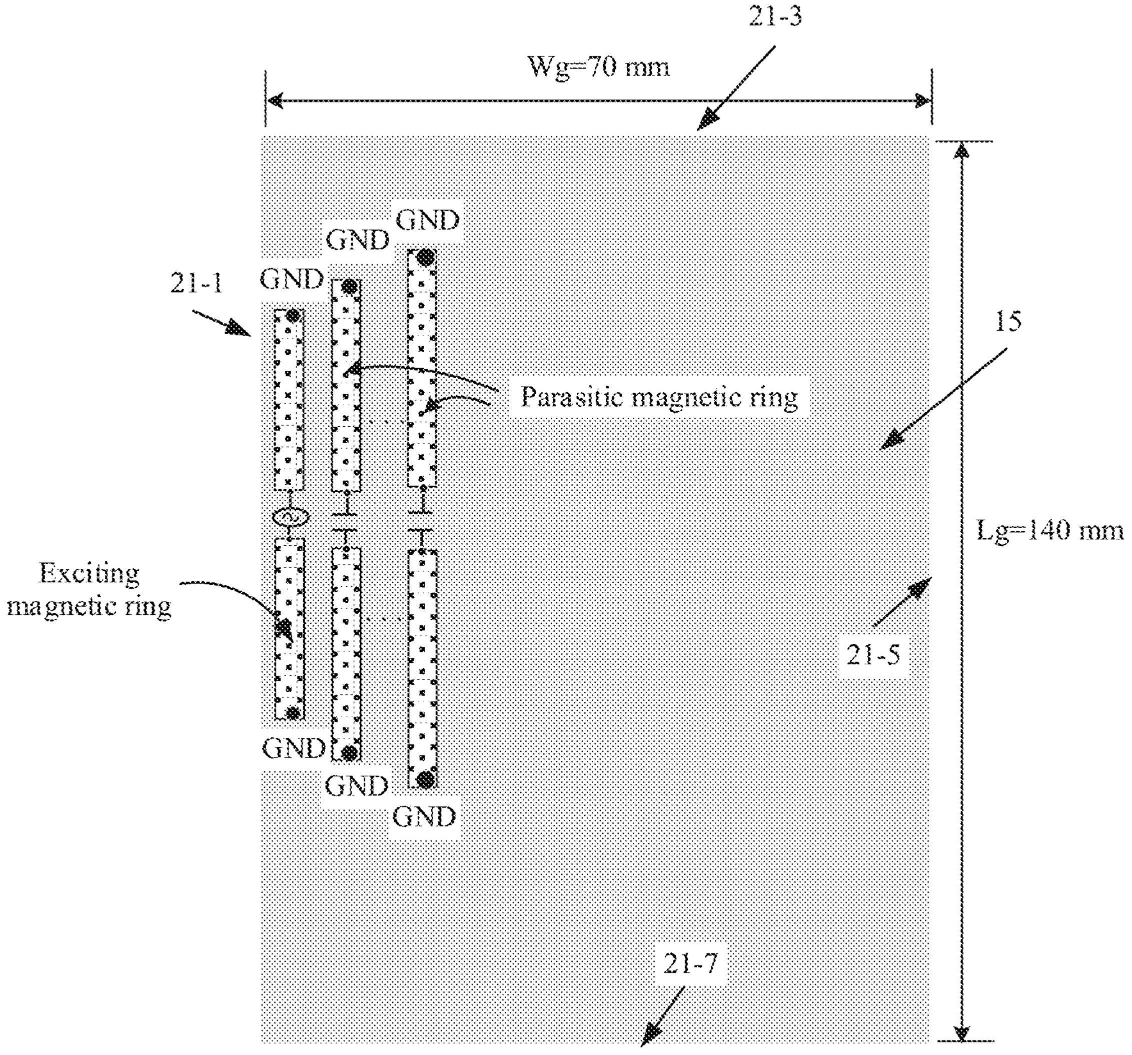
FIG. 15A is a schematic layout diagram of an exciting element and a parasitic element on a ground plane according to this application.
Figure 15B:
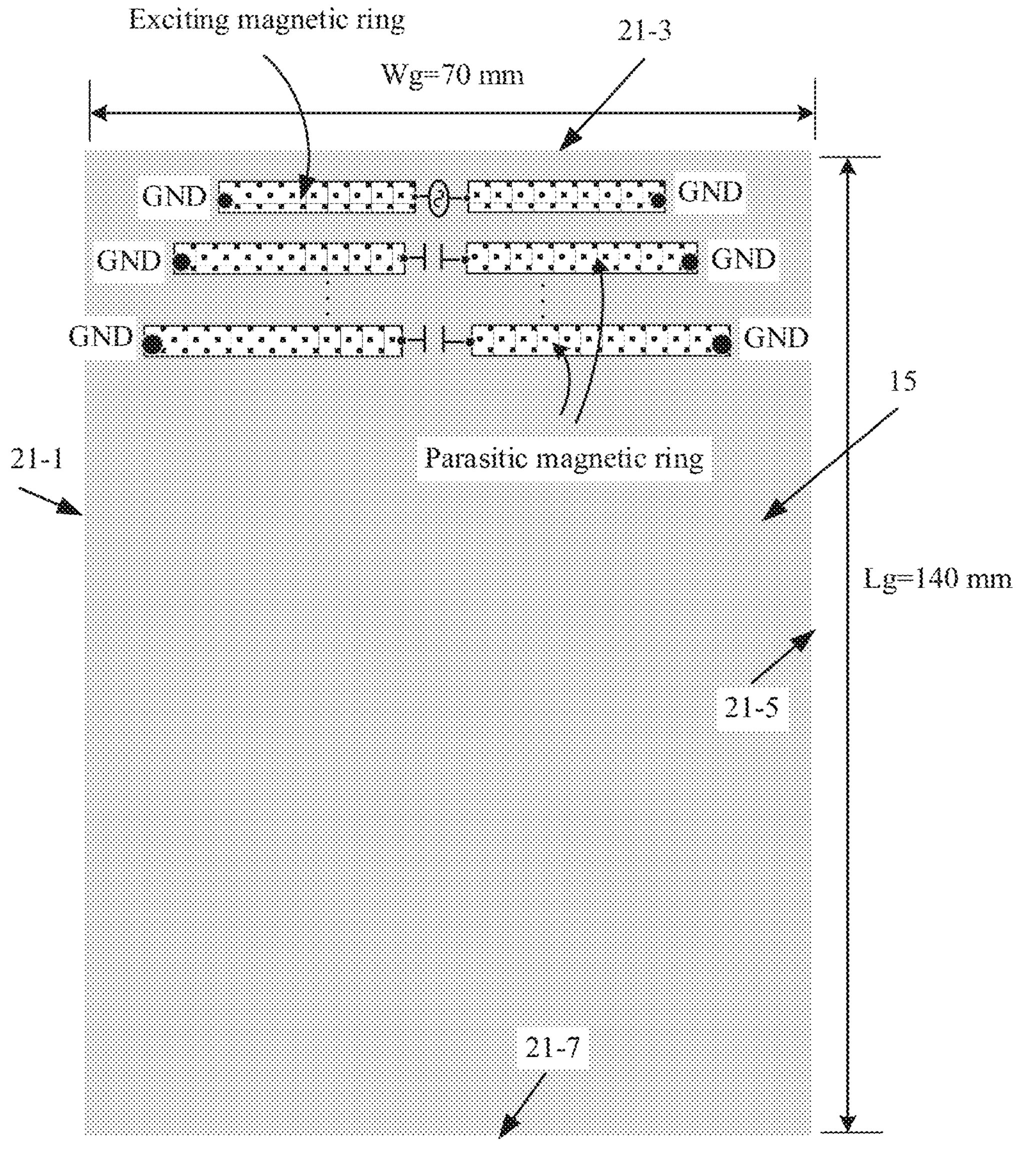
FIG. 15B is another schematic layout diagram of an exciting element and a parasitic element on a ground plane according to this application.

In addition to being disposed in proximity to lateral sides of the ground plane 15 shown in FIG. 15A, the exciting element 23 and the parasitic element or only the exciting element 23 may be disposed in proximity to the bottom side 21-7 or the top side 21-3 of the ground plane 15, as shown in FIG. 15B. In other words, the first side of the ground plane may be a lateral side of the ground plane 15, for example, the lateral side 21-1 or the lateral side 21-5, or may be the bottom side 21-7 or the top side 21-3 of the ground plane 15.

Figure 16:
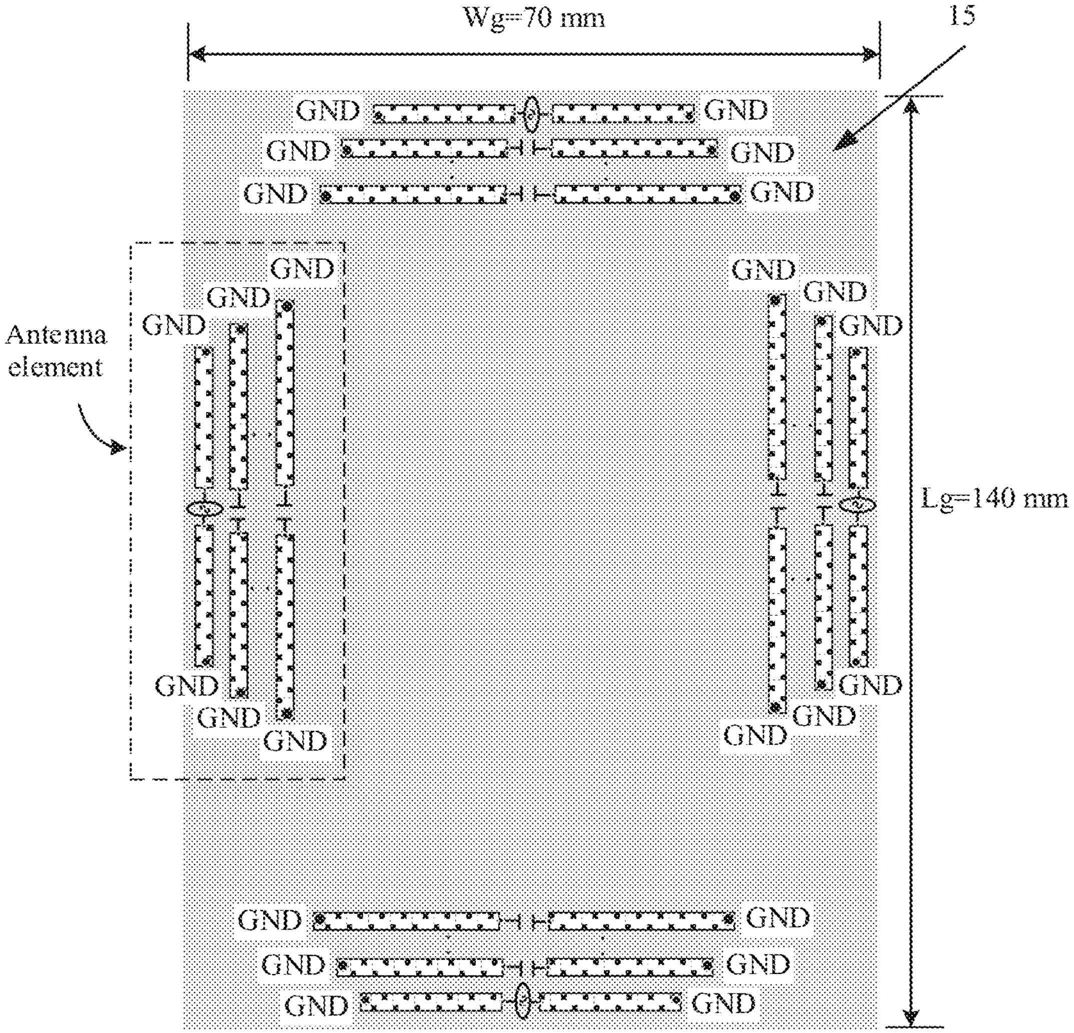
FIG. 16 is a schematic layout diagram of an exciting element and a parasitic element for implementing MIMO on a ground plane.

To implement multi input multi output (multi input multi output, MIMO), the antenna apparatus provided in this application may include a plurality of antenna elements. One antenna element may have one exciting element 23, or may have one exciting element 23 and M (M is a positive integer) parasitic elements. The plurality of antenna elements may be disposed in proximity to the sides of the ground plane 15. For example, as shown in FIG. 16, four antenna elements may be respectively disposed in proximity to four sides of the ground plane 15. In this case, 4×4 MIMO can be implemented. If two antenna elements in FIG. 16 are removed, 2×2 MIMO can be implemented. If more antenna elements are added in proximity to the ground plane in FIG. 16, high-order MIMO can be implemented.

Figure 17A:
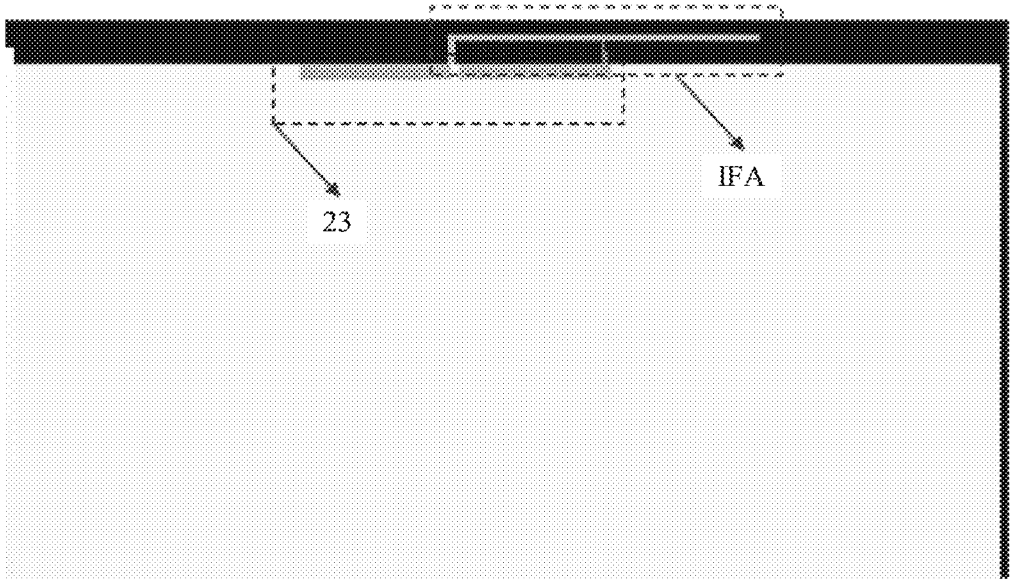
FIG. 17A is a schematic diagram of an antenna apparatus using an IFA as a parasitic element.
Figure 17B:
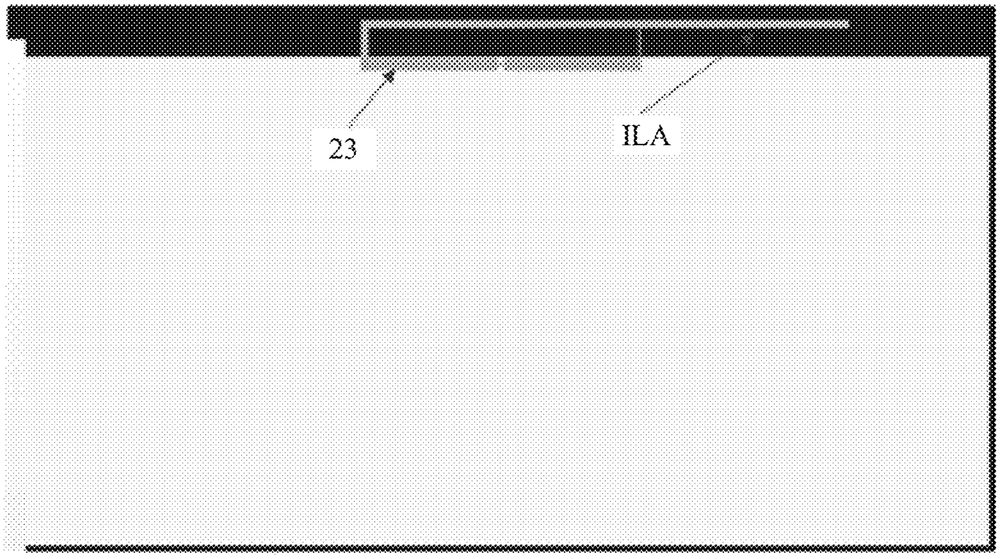
FIG. 17B is a schematic diagram of an antenna apparatus using an ILA as a parasitic element.
Figure 17C:
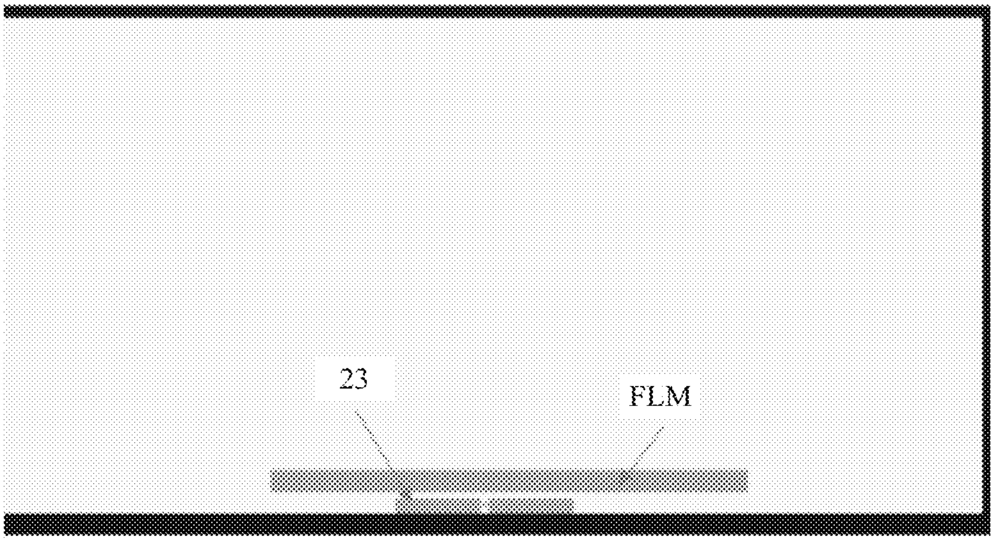
FIG. 17C is a schematic diagram of an antenna apparatus using a floating antenna as a parasitic element.

The parasitic element is not limited to the parasitic magnetic ring having the same structure as the exciting element 23. To implement a multi-band or a wide-band, the parasitic element may alternatively be another antenna, such as a support antenna or a floating antenna. The support antenna may include an inverted F antenna (inverted F antenna, IFA), an inverted L antenna (inverted L antenna. ILA), and the like. FIG. 17A shows an example of a parasitic IFA antenna. FIG. 17B shows an example of a parasitic ILA antenna, and FIG. 17C shows an example of a parasitic floating metal antenna (floating metal antenna, FLM). The parasitic floating metal antenna may be affixed or printed on an inner surface or an outer surface of a non-metal back cover (for example, a glass back cover).

In some embodiments, the IFA may also serve as an exciting element, namely, the IFA is fed, and the IFA may couple energy to a magnetic ring having a same structure as the exciting element 23. Then, the magnetic ring may couple energy to the ground plane, to excite the ground plane to generate radiation. In this case, a matching network of the IFA as an exciting element may be that a 1 pF capacitor is first connected in series, and then a 4 nH inductor is connected m parallel. A 0.8 pF capacitor may be connected in series on the magnetic ring as a parasitic element. Similarly, the ILA may also serve as an exciting element, namely, the ILA is fed, and the ILA can couple energy to a magnetic ring having a same structure as the exciting element 23. Then, the magnetic ring may couple energy to the ground plane, to excite the ground plane to generate radiation.

The capacitor and the inductor mentioned in the foregoing content of this application may be implemented by using a lumped element, or may be implemented by using a distributed element.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An antenna apparatus of an electronic device and comprising:
- a ground plane; and
- an exciting element comprising:
  - a first branch, wherein a first gap is disposed between the first branch and the ground plane, and wherein the first branch comprises:
    - a first end; and
    - a second end; and
  - second branches coupling the first branch to the ground plane, wherein the second branches comprise:
    - a third branch comprising a third end coupled to the first end and a fourth end coupled to the ground plane; and
    - a fourth branch comprising a fifth end coupled to the second end and a sixth end coupled to the ground plane,
- wherein the ground plane comprises:
  - a first side, wherein a distance from the exciting element to the first side is L1;
  - a second side opposite to the first side, wherein a distance from the exciting element to the second side is L2, and wherein L1 is less than L2;
  - a third side, wherein a distance from a seventh end of the exciting element to the third side is p1, wherein the seventh end is proximate to the third side; and
  - a fourth side opposite to the third side, wherein a distance from an eighth end of the exciting element to the fourth side is p2, wherein a difference between p1 and p2 is less than a first value, and wherein, the eighth end is proximate to the fourth side;
  - a feeding port disposed on the exciting element;
  - a first slot disposed on the first branch and defining two parts of the first branch on two sides of the first slot; and
  - a first capacitor coupled in series between the two parts of the first branch,
  - wherein p1 is equal to p2.

2. The antenna apparatus of claim 1, wherein L1 is equal to zero.

3. The antenna apparatus of claim 1, wherein the first slot is disposed in a middle of the first branch.

4. The antenna apparatus of claim 1, wherein the feeding port is disposed on either the first branch or the second branch.

5. The antenna apparatus of claim 1, further comprising a matching network integrated with the feeding port, wherein the matching network comprises:
- a second capacitor coupled in series to the feeding port; and
- a first inductor coupled in parallel to the feeding port.

6. The antenna apparatus of claim 1, further comprising a matching network integrated with the feeding port, wherein the matching network comprises:
- a third capacitor;
- a second inductor coupled in parallel to the feeding port; and
- a first parallel circuit comprising:
  - a fourth capacitor; and
  - a third inductor coupled in parallel to the fourth capacitor,
  - wherein the third capacitor and the first parallel circuit are sequentially coupled in series to the feeding port.

7. The antenna apparatus of claim 1, further comprising one or more parasitic elements, wherein each of the one or more parasitic elements is coupled with the ground plane, wherein a distance from each of the one or more parasitic elements to the first side is L3, wherein a distance from each of the one or more parasitic elements to the second side is L4, and wherein L3 is less than L4.

8. The antenna apparatus of claim 7, wherein each of the one or more parasitic element comprises:
- a fifth branch, wherein a second gap is disposed between the fifth branch and the ground plane, and wherein the fifth branch comprises:
  - a ninth end; and
  - a tenth end;
- sixth branches coupling the fifth branch to the ground plane, wherein the sixth branches comprise:
  - a seventh branch comprising an eleventh end coupled to the ninth end and a twelfth end coupled to the ground plane; and
  - an eighth branch comprising a thirteenth end coupled to the tenth end and a fourteenth end coupled to the ground plane,
- a second slot disposed on the fifth branch defining two parts of the fifth branch on two sides of the second slot; and
- a fifth capacitor coupled in series between the two parts of the fifth branch.

9. The antenna apparatus of claim 7, wherein each of the one or more parasitic elements comprises one of an inverted F antenna, an inverted L antenna, or a floating metal antenna disposed on an inner surface or an outer surface of a non-metal back cover of the electronic device.

10. The antenna apparatus of claim 1, wherein the first capacitor is a lumped capacitor or a distributed capacitor.

11. An antenna apparatus of an electronic device and comprising:
- a ground plane; and
- a plurality of antenna elements disposed on the ground plane, wherein each of the antenna elements comprises:
  - one exciting element or the one exciting element and M parasitic elements, wherein M is a non-negative integer, wherein the one exciting element comprises:
    - a first branch, wherein a first gap is disposed between the first branch and the ground plane, and wherein the first branch comprises:
    - a first end; and
    - a second end; and
    - second branches coupling the first branch to the ground plane, wherein the second branches comprise:
      - a third branch comprising a third end coupled to the first end and a fourth end coupled to the ground plane; and
      - a fourth branch comprising a fifth end coupled to the second end, and a sixth end coupled to the ground plane,
- wherein the ground plane comprises:
  - a first side, wherein a distance from the one exciting element to the first side is L1;
  - a second side opposite to the first side, wherein a distance from the one exciting element to the second side is L2, and wherein L1 is less than L2;
  - a third side, wherein a distance from a seventh end of the one exciting element to the third side is p1, wherein the seventh end is proximate to the third side; and
  - a fourth side that is opposite to the third side, wherein a distance from an eighth end of the one exciting element to the fourth side is p2, wherein the eighth end is proximate to the fourth side, and wherein a difference between p1 and p2 is less than a first value;
- a feeding port disposed on the one exciting element;
- a first slot disposed on the first branch defining two parts of the first branch on two sides of the first slot; and
- a first capacitor coupled in series between the two parts of the first branch, and
- wherein, when M is not equal to zero, each of the M parasitic elements is coupled with the ground plane, wherein a distance from each of the M parasitic elements to the first side is L3, wherein a distance from each of the M parasitic elements to the second side is L4, and wherein L3 is less than L4,
- wherein p1 is equal to p2.

12. The antenna apparatus of claim 11, wherein L1 is equal to zero.

13. The antenna apparatus of claim 11, wherein the first slot is disposed in a middle of the first branch.

14. The antenna apparatus of claim 11, wherein the feeding port is disposed on either the first branch or the second branch.

15. The antenna apparatus of claim 11, further comprising a matching network integrated with the feeding port, wherein the matching network comprises:
- a second capacitor coupled in series to the feeding port; and
- a first inductor coupled in parallel to the feeding port.

16. The antenna apparatus of claim 11, further comprising a matching network integrated with the feeding port, wherein the matching network comprises:
- a third capacitor;
- a second inductor coupled in parallel to the feeding port; and
- a first parallel circuit comprising:
  - a fourth capacitor; and
  - a third inductor coupled in parallel,
- wherein the third capacitor and the first parallel circuit are sequentially coupled in series to the feeding port.

17. The antenna apparatus of claim 11, wherein each of the M parasitic elements comprises:
- a third branch, wherein a second gap is disposed between the third branch and the ground plane, and wherein the third branch comprises:
  - a ninth end; and
  - a tenth end;
- fourth branches coupling the third branch to the ground plane, wherein the fourth branches comprise:
  - a fifth branch comprising an eleventh end coupled to the ninth end and a twelfth end coupled to the ground plane; and
  - a sixth branch comprising a thirteenth end coupled to the tenth end and a fourteenth end coupled to the ground plane;
- a second slot disposed on the third branch defining two parts of the third branch on two sides of the second slot; and
- a fifth capacitor coupled in series between the two parts of the third branch.

18. An electronic device comprising:
- a back cover comprising an insulating material; and
- an antenna apparatus comprising:
  - a ground plane;
  - an exciting element comprising:
    - a first branch, wherein a gap is disposed between the first branch and the ground plane, and wherein the first branch comprises:
      - a first end; and
      - a second end;

second branches coupling the first branch to the ground plane, wherein the second branches comprise:

a third branch comprising a third end coupled to the first end and a fourth end coupled to the ground plane; and a fourth branch comprising a fifth end coupled to the second end and a sixth end coupled to the ground plane, wherein the ground plane comprises:

a first side, wherein a distance from the exciting element to the first side is L1;

a second side that is opposite to the first end, wherein a distance from the exciting element to the second side is L2, and wherein L1 is less than L2;

a third side, wherein a distance from a seventh end of the exciting element to the third side is p1, and wherein the seventh end is proximate to the third side; and a fourth side that is opposite to the third side, wherein a distance from an eighth end of the exciting element to the fourth side is p2, wherein a difference between p1 and p2 is less than a first value, and wherein the eighth end is proximate to the fourth side;

a feeding port disposed on the exciting element;

a first slot disposed on the first branch defining two parts of the first branch on two sides of the first slot; and a first capacitor coupled in series between the two parts of the first branch, wherein p1 is equal to p2.

* * * * *